(12) United States Patent
Amine et al.

(10) Patent No.: US 8,492,033 B2
(45) Date of Patent: Jul. 23, 2013

(54) FAST CURE GEL POLYMER ELECTROLYTES

(75) Inventors: Khalil Amine, Oak Brook, IL (US); Zhengcheng Zhang, Naperville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 282 days.

(21) Appl. No.: 12/815,149

(22) Filed: Jun. 14, 2010

(65) Prior Publication Data

US 2010/0330433 A1    Dec. 30, 2010

Related U.S. Application Data

(60) Provisional application No. 61/218,123, filed on Jun. 18, 2009.

(51) Int. Cl.
*H01M 6/16* (2006.01)
*H01M 4/82* (2006.01)
*C08G 77/04* (2006.01)

(52) U.S. Cl.
USPC .............................. 429/302; 29/623.5; 528/10

(58) Field of Classification Search
None
See application file for complete search history.

(56) References Cited

U.S. PATENT DOCUMENTS

| | | | |
|---|---|---|---|
| 4,908,283 A * | 3/1990 | Takahashi et al. | 429/317 |
| 5,037,712 A * | 8/1991 | Shackle et al. | 429/312 |
| 5,112,512 A * | 5/1992 | Nakamura | 252/62.2 |
| 5,194,490 A * | 3/1993 | Suga et al. | 524/755 |
| 5,731,104 A * | 3/1998 | Ventura et al. | 429/188 |
| 5,885,733 A * | 3/1999 | Ohsawa et al. | 429/309 |
| 6,013,393 A * | 1/2000 | Taniuchi et al. | 429/303 |
| 6,841,601 B2 * | 1/2005 | Serpico et al. | 524/261 |
| 6,858,351 B2 | 2/2005 | Miura et al. | |
| 6,887,619 B2 | 5/2005 | West et al. | |
| 7,105,254 B2 | 9/2006 | Oyama | |
| 7,235,331 B2 | 6/2007 | Noda et al. | |
| 7,473,491 B1 | 1/2009 | Amine et al. | |
| 7,588,859 B1 * | 9/2009 | Oh et al. | 429/188 |
| 8,076,031 B1 * | 12/2011 | West et al. | 429/313 |
| 2003/0198869 A1 * | 10/2003 | West et al. | 429/313 |
| 2004/0248014 A1 * | 12/2004 | West et al. | 429/313 |

(Continued)

FOREIGN PATENT DOCUMENTS

| | | |
|---|---|---|
| KR | 1020000022943 | 4/2000 |
| KR | 1020060116852 | 11/2006 |
| WO | WO 2005/083828 A1 | 9/2005 |
| WO | WO 2006/065605 | 6/2006 |

OTHER PUBLICATIONS

Fenton, D.E. et al., "Complexes of Alkali Metal ions with Poly(ethylene oxide)", *Polymer*, v.14, No. 11, p. 589 (Nov. 1973).

(Continued)

*Primary Examiner* — Robert S Loewe
(74) *Attorney, Agent, or Firm* — Foley & Lardner LLP

(57) ABSTRACT

Fast-cure gel polymer electrolytes are prepared by trapping an oligo(alkylene glycol)siloxane or silane in a three dimensional polymer matrix. An ion-conducting phase of the electrolyte contains a siloxane or silane compound and a lithium salt. Such siloxanes or silanes include a silicon or silicon oxide group having four or less substituents that is an oligo(alkylene glycol), or cyclic carbonate moiety.

20 Claims, 2 Drawing Sheets

U.S. PATENT DOCUMENTS

| | | | |
|---|---|---|---|
| 2005/0064116 A1* | 3/2005 | Sha et al. | 428/34 |
| 2007/0065728 A1* | 3/2007 | Zhang et al. | 429/326 |
| 2008/0134492 A1* | 6/2008 | Amine et al. | 29/623.1 |
| 2008/0318136 A1* | 12/2008 | Amine et al. | 429/341 |
| 2009/0081557 A1* | 3/2009 | Chen et al. | 429/337 |

OTHER PUBLICATIONS

Amine, K. et al., "Novel Silane Compounds as Electrolyte Solvents for Li-ion Batteries", *Electrochemical Communications*, v.8, No. 3, pp. 429-433 (Mar. 2006).

Kelly, I.E. et al., "Poly(ethylene oxide) Electrolytes for Operation at Near Room Temperature", *Journal of Power Sources*, v.14, No. 1-3, pp. 13-21 (Jan.-Mar. 1985).

Karekar, R.N. et al., Studies on Comb-like Polymer Blend with Poly(ethylene oxide)—Lithium Perchlorate Salt Complex Electrolyte, *Polymer*, v.38 No. 14, pp. 3709-3712 (1997).

Wang, Z. et al., "Thermal, Electrochemical, and Spectroscopic Characterizations of Hyperbranched Polymer Electrolyte", *Journal of the Electrochemical Society*, v.146, No. 6, pp. 2209-2215 (Jun. 1999).

International Preliminary Report on Patentability and Written Opinion from PCT/US2007/084481, mailed Jun. 25, 2009.

* cited by examiner

US 8,492,033 B2

FAST CURE GEL POLYMER ELECTROLYTES

CROSS-REFERENCE TO RELATED APPLICATIONS

This application claims the benefit of U.S. Provisional Application Ser. No. 61/218,123, filed Jun. 18, 2009, which is incorporated herein by references in its entirety for any all purposes.

GOVERNMENT RIGHTS

The United States Government has rights in this invention pursuant to Contract No. DE-AC02-06CH11357 between the United States Government and UChicago Argonne, LLC, representing Argonne National Laboratory.

FIELD

The present invention generally relates to polymer electrolytes for use in electrochemical cells. Specifically, electrolytes are generally prepared by fast formation of gel polymer electrolytes.

BACKGROUND

Lithium batteries have historically employed organic carbonates as electrolyte solvents. However, organic carbonates are typically associated with high degrees of volatility, flammability, toxicity and chemical reactivity. To overcome these disadvantages, electrochemical cells having solid polymer electrolyte (SPE) systems have been prepared in recent years. The ionic conductivity of SPEs was first reported in 1973 for a system of the polyether/alkali metal complex of polyethylene oxide (PEO)/and potassium thiocyanates (KSCN). See D. E. Fenton, J. M. Parker, P. V. Wright, *Polymer* 14 (1973) 589.

SPE systems have the potential to exhibit numerous advantages over their liquid counterparts, including high energy density, high electrolyte stability, and the ability to be configured in nearly any shape. Such properties are possible because the electrolyte does not contain liquid, has less cost, and is inherently safer. Prior to the 1990's, the research into SPEs had focused on PEO-based electrolytes. The PEO that was typically used was a high molecular weight linear polymer having a semi-crystalline microstructure, and providing relatively strong and free-standing films at room temperature. Such PEO systems may be doped with lithium salt, for example, lithium trifluoromethanesulfonimide (LiTFSI).

Many PEO/lithium salt compositions are predominantly crystalline at room temperature, but melt above about 68° C. As a result, room temperature ionic conductivities are poor (approximately $10^{-7}$ S/cm). The improvement in conductivity by using LiTFSI is due to the plasticizing effect of the trifluoromethansulfonimide anion, which substantially reduces the crystallinity of the PEO composition at room temperature. It is important to note that only amorphous PEO electrolytes are ionically conductive. Operation of PEO-based SPEs at elevated temperatures limits their wide application in electrochemical cells.

To increase the room temperature conductivity of PEO, a variety of approaches have been explored. Alkyl phthalates and poly(ethylene glycol)dialkyl ethers with low molecular weights have been used as plasticizing additives for SPE to reduce the crystalline region and increase the mobility of the SPE molecular chain at ambient temperature. Low molecular poly(ethylene glycol)-dialkyl ether compounds can contribute to increased room temperature ionic conductivity of SPEs, but they still exhibit crystallization problems which result in a decrease in the ionic conductivity. See Kelly et. al. *J. Power Sources* 14, 13 (1985).

Another approach to improving the ionic conductivity at ambient temperature is to synthesize a highly branched PEO to decrease the crystalline tendency of PEO main chain and to increase the chain mobility regarding lithium ion transport such as hyper-branched solid polymer electrolyte (See Z. Wang et. al. *J. Electrochem. Soc.* 146(6), 2209 (1999); and comb-like solid polymer electrolyte (See R. N. Karekar et. al. *Polymer* 38(14): 3709 (1997). However, the ionic conductivity is still low even at ambient temperature. All of these attempts were intended to generate an amorphous polymer, at, or near, ambient temperature.

Oligo(ethylene glycol) substituted oligosiloxanes or silanes have also been prepared as ionically conductive polymer hosts. *Electrochemical Communications* 8, 429-433 (2006). Such materials show conductivities as high as 2 mS/cm at room temperature, when doped with LiTFSI or lithium bis(oxlato)borate (LiBOB). These Si-containing electrolytes have shown excellent performance in electrochemical cells such as lithium ion cells, including long cycle life, low vapor pressure, low flammability and self-distinguish, good electrode wetting ability. It has also been found that the electrochemical working window can be improved (e.g. up to 4.6 V vs. Li$^+$/Li) by adding a silicon-based terminal group to the oligoether chain, i.e. oligo(ethylene glycol) substituted oligosiloxanes/silanes. However, the dimensional stability of these Si-electrolytes is poor and the glutinous nature of the materials flow even under mild pressure at ambient temperature.

SUMMARY

Fast-cure gel polymer electrolytes may be prepared by trapping an oligo(alkylene glycol)siloxane or silane in a three dimensional polymer matrix. The conducting phase of the oligo(alkylene glycol)siloxane or silanes is a non-volatile electrolyte compared to volatile carbonate-based organic electrolytes. Volatile electrolyte components may present processing hurdles due to evaporation, and both environmental and safety concerns.

Methods of preparing fast-cure gel polymers employ a combination initiator-promoter at ambient elevated temperature during the coating of gel precursors onto the electrode surface. In some cases, the gel polymer electrolyte contains one or more electrode stabilizing additives, which at the solid electrolyte interface (SEI) minimize or eliminate continuous reactions of the electrode and the gel polymer electrolyte components.

Compositions for forming fast-cure gel polymer electrolytes include an oligo(alkylene glycol)silane or an oligo(alkylene)glycol siloxane; a cross-linking agent; a salt; a cross-linking initiator, a initiator promoter, and an electrode stabilizing additive. The oligo(alkylene glycol)silane or oligo(alkylene)glycol siloxane may be a monosilane or monosiloxane, a disilane or disiloxane, or a trisilane or trisiloxane.

Methods for the preparation of fast-cure gel polymer electrolytes and electrochemical cells using the fast-cure gel electrolytes are also provided. The fast-cure gel polymer electrolytes are suitable for use in electrochemical cells including, but not limited to, lithium primary batteries, lithium secondary batteries, lithium air cells and electric double layer capacitors.

In one aspect, a composition that is a fast-cure gel polymer electrolyte is provided, including an oligo(alkylene glycol)

silane or an oligo(alkylene)glycol siloxane; a cross-linking agent; a salt; a cross-linking initiator; a initiator promoter; and an electrode stabilizing additive. In some embodiments, the oligo(alkylene glycol)silane is an oligo(ethylene glycol)silane, oligo(propylene glycol)silane, or oligo(butylene glycol)silane. In some embodiments, the oligo(alkylene)glycol siloxane is an oligo(ethylene glycol)siloxane, oligo(propylene glycol)siloxane, or oligo(butylene glycol)siloxane.

In some embodiments, the oligo(alkylene glycol)silane is a compound of Formula I:

$$SiR^1_{4-x-y}R^2_xR^3_y \qquad \text{Formula I}$$

individually alkyl or aryl; $R^8$ is a divalent organic spacer; f is 1 or 2; n is an integer from 0 to 15; p is 0, 1, 2, or 3; and q is 0, 1, 2, or 3. In some embodiments, $R^8$ is a divalent spacer selected from a alkylene, alkylene glycol, or bivalent ether group. In some embodiments, x is one and y is zero. In some embodiments, $R^2$ is a group of Group I; and $R^4$ is a bond. In some embodiments, $R^4$ is other than a bond. In some embodiments, x is one; y is zero; $R^2$ is a moiety that is Group I; and $R^4$ is a bond. In some embodiments, x is one; y is zero; $R^2$ is a moiety that is Group I; and $R^4$ is other than a bond. In some embodiments, the compound of Formula I is:

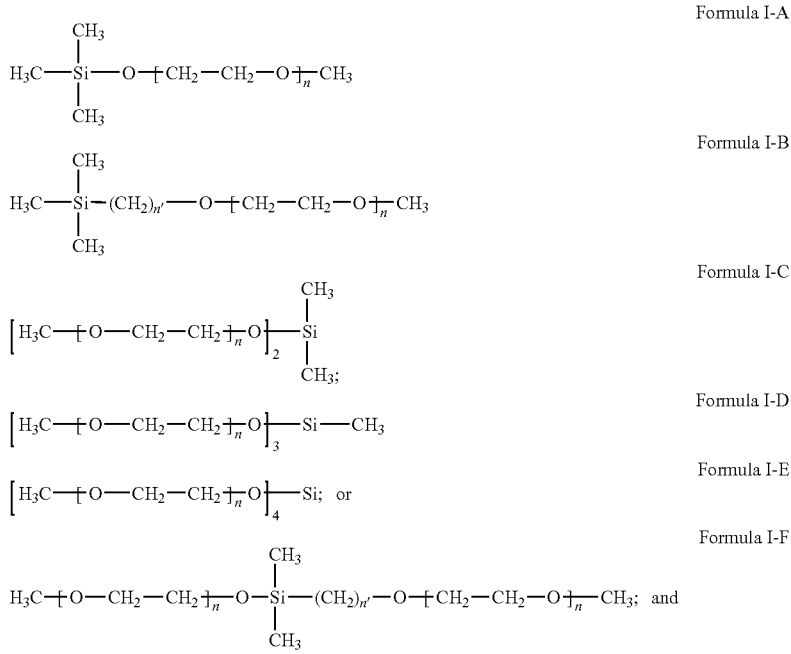

where, each $R^1$ is individually an alkyl group, alkenyl group, alkynyl group, alk(poly)enyl group, alk(poly)ynyl group, or aryl group; each $R^2$ is individually a group of Group I or Group II; each $R^3$ is individually a group of Group I or Group III; x is 1, 2, 3, or 4; y is 0, 1, 2, or 3; the sum of x and y is greater than or equal to one;

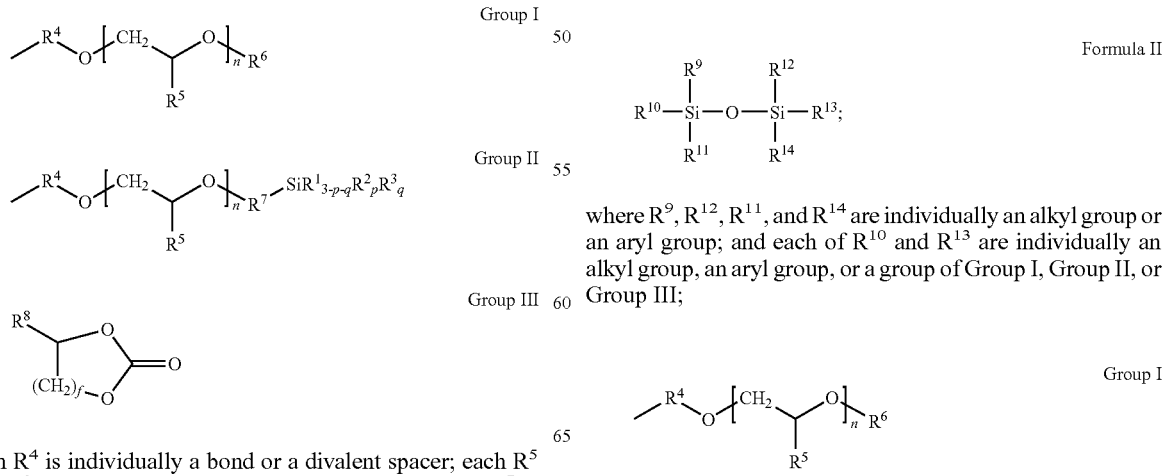

each $R^4$ is individually a bond or a divalent spacer; each $R^5$ and $R^6$ are individually hydrogen, alkyl, or aryl; each $R^7$ is each n is individually an integer from 1 to 15; and each n' is individually an integer selected from 1, 2, or 3. In some embodiments, n is an integer from 2 to 8. In some embodiments, each n' is individually 1 or 3.

In some embodiments, the oligo(alkylene glycol)siloxane is a disiloxane. In some embodiments, the disiloxane is represented by Formula II:

$$\begin{array}{c} R^9 \quad\; R^{12} \\ | \quad\quad | \\ R^{10}-Si-O-Si-R^{13}; \\ | \quad\quad | \\ R^{11} \quad R^{14} \end{array} \qquad \text{Formula II}$$

where $R^9$, $R^{12}$, $R^{11}$, and $R^{14}$ are individually an alkyl group or an aryl group; and each of $R^{10}$ and $R^{13}$ are individually an alkyl group, an aryl group, or a group of Group I, Group II, or Group III;

Group I

-continued

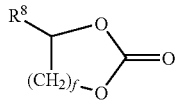
Group II

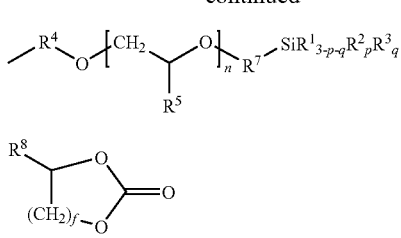
Group III each $R^4$ is individually a bond or a divalent spacer; each $R^5$ and $R^6$ are individually hydrogen, alkyl, or aryl; each $R^7$ is individually alkyl or aryl; $R^8$ is a divalent organic spacer; f is 1 or 2; n is an integer from 0 to 15; p is 0, 1, 2, or 3; and q is 0, 1, 2, or 3. In some embodiments, $R^{10}$ is selected from Group I, Group II, or Group III. In some embodiments, $R^{13}$ is an alkyl group, an aryl group, or a group of Group I or Group III. In some embodiments, $R^{13}$ is selected from Group I or Group III. In some embodiments, $R^{10}$ is selected from an alkyl group, an aryl group, or Group I. In some embodiments, $R^{10}$ is an alkyl, an aryl, or Group III. In some embodiments, $R^9$, $R^{12}$, $R^{11}$, and $R^{14}$ are individually an alkyl group. In some embodiments, $R^9$, $R^{12}$, $R^{11}$, and $R^{14}$ are individually a group selected from methyl, ethyl, n-propyl, iso-propyl, n-butyl, iso-butyl, or tert-butyl. In some embodiments, $R^9$, $R^{12}$, $R^{11}$, and $R^{14}$ are each a methyl group. In some embodiments, $R^{13}$ is a moiety of Group I, and $R^4$ is a bond. In some embodiments, $R^{13}$ is a moiety of Group I, and $R^4$ is a divalent organic moiety. In some embodiments, $R^{13}$ is a Group I, and $R^{10}$ as an alkyl group or an aryl group.

In some embodiments, the compound of Formula II is:

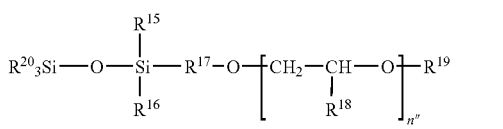
Formula II-A

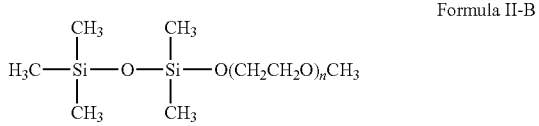
Formula II-B

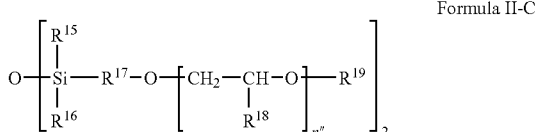
Formula II-C

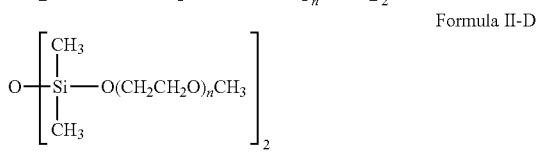
Formula II-D each $R^{15}$ and $R^{16}$ are individually an alkyl group or an aryl group; each $R^{17}$ is a bond or a divalent spacer; each $R^{18}$ is individually a hydrogen atom or an alkyl group; each $R^{19}$ is individually an alkyl group; each $R^{20}$ is individually an alkyl or an aryl group; n is an integer from 1 to 15, and n" is an integer from 1 to 30. In some embodiments, $R^{17}$ is a divalent spacer selected from a alkylene, alkylene glycol, or bivalent ether group. In some embodiments, $R^{17}$ is a —(CH$_2$)$_3$— group. In some embodiments, $R^{17}$ is substituted with a halogen. In some such embodiments, the halogen is F. In some embodiments, $R^{17}$ is a —(CF$_2$)$_3$— group. In some embodiments, each $R^{20}$ is individually an alkyl group. In some embodiments, each $R^{20}$ is individually a methyl, ethyl, n-propyl, iso-propyl, n-butyl, iso-butyl, or tert-butyl group. In some embodiments, each $R^{20}$ is a methyl group. In some embodiments, each $R^{20}$ is a methyl, $R^{17}$ is —(CH$_2$)$_3$—; and $R^{18}$ is a hydrogen. In some embodiments, each $R^{20}$ is a methyl; $R^{17}$ is —(CH$_2$)$_3$—; $R^{18}$ is a hydrogen; and n is 3.

In some embodiments, the oligo(alkylene glycol)siloxane is a trisiloxane. In some embodiments, the trisiloxane is a compound of Formula IV:

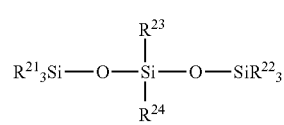
Formula IV where each $R^{21}$, $R^{22}$, and $R^{23}$ are individually an alkyl group or an aryl group; and $R^{24}$ is selected from Group I, Group II, or Group III;

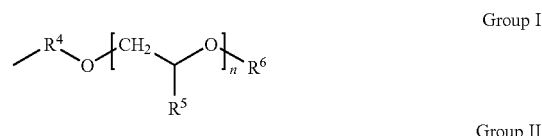
Group I

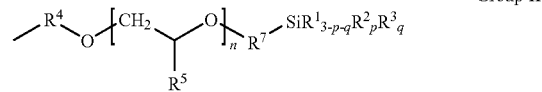
Group II

Group III

each $R^4$ is individually a bond or a divalent spacer; each $R^5$ and $R^6$ are individually hydrogen, alkyl, or aryl; each $R^7$ is individually alkyl or aryl; $R^8$ is a divalent organic spacer; f is 1 or 2; n is an integer from 0 to 15; p is 0, 1, 2, or 3; and q is 0, 1, 2, or 3. In some embodiments, the trisiloxane is a compound of Formula IV-A, Formula IV-B, Formula IV-C, or Formula IV-D:

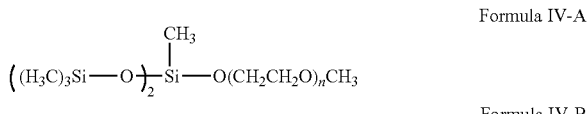
Formula IV-A

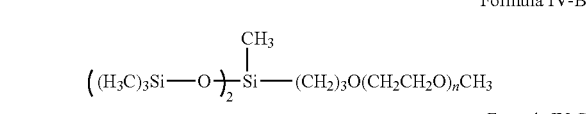
Formula IV-B

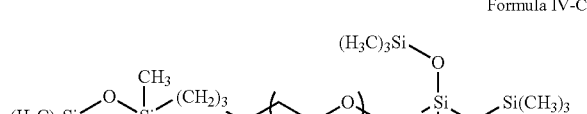
Formula IV-C

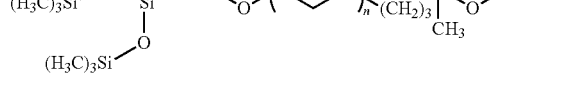

-continued

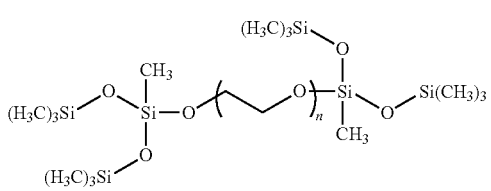
Formula IV-D where each n is independently an integer from 1 to 12.

In some embodiments, the compositions also include a carbonate-based solvent. In some embodiments, the carbonate-based solvent is present at less than 50 wt %.

In some embodiments, the salt of the compositions is an alkali metal salt or an ammonium salt.

In some embodiments, the compositions also include a cross-linking agent and a cross-linking density controller. In some embodiments, the cross-linking agent is a compound of Formula V and a cross-linking density controller is a compound of Formula VI:

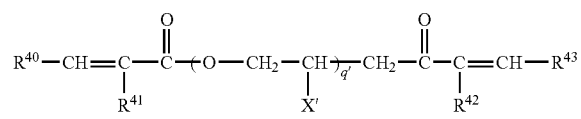
Formula V

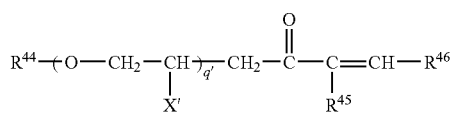
Formula VI where $R^{40}$, $R^{41}$, $R^{42}$, $R^{43}$, $R^{44}$, $R^{45}$, and $R^{46}$ are each independently hydrogen, a alkyl group having from 1 to 12 carbon atoms, or an alkenyl group having from 2 to 12 carbon atoms; X' is hydrogen, methyl, or ethyl; and q' is an integer from 1 to 20. In some embodiments, the cross-linking agent is a compound of Formula VII, VIII, IX or X:

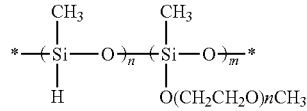
Formula VII

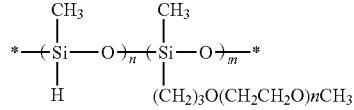
Formula VIII

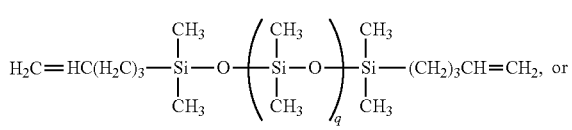
Formula IX

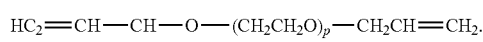
Formula X where n and m are integers where sum of n and m is from 10 to 500, from 20 to 300, from 30 to 100, or from 35 to 50; p is an integer from 2 to 20; q is an integer from 4 to 35; and the ratio of n/m ranges from 1:4 to 1:200.

In some embodiments, the oligo(alkylene glycol)siloxane or oligo(alkylene glycol)silane present from about 5 wt % to about 80 wt %. In some embodiments, the oligo(alkylene glycol)siloxane or oligo(alkylene glycol)silane present from about 40 wt % to about 80 wt %. In some embodiments, the oligo(alkylene glycol)siloxane or oligo(alkylene glycol)silane present from about 60 wt % to about 70 wt %.

In some embodiments, the compositions also include a reaction cure-promoter. In some such embodiments, the reaction cure-promoter is a tertiary amine compound or a cobalt compound. In some other such embodiments, the reaction cure-promoter is N,N-dimethylaniline, N,N-diethylaniline, N,N-dimethyl-p-toluidine, N,N-dimethyl-m-toluidine, 4-N,N-dimethylamino phenethyl alcohol, 4-N,N-dimethylamino phenyl acetic acid, ethyl-4-dimethylamino benzoate, 4-N,N-dimethylaminobenzyl alcohol, 4-N,N-dimethylaminobenzyl methacrylate, cobalt naphthenate or cobalt octonate. In some further embodiments, the reaction cure-promoter is a combination of a tertiary amine with benzoyl peroxide.

In some embodiments, the compositions further include a silicon-containing compound having a carbonate group. In some embodiments, the silicon-containing compound having a carbonate group is selected from

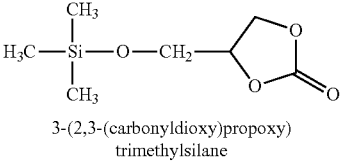
3-(2,3-(carbonyldioxy)propoxy) trimethylsilane

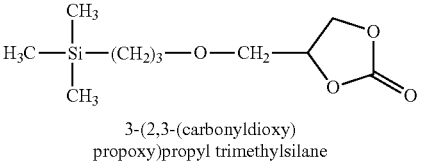
3-(2,3-(carbonyldioxy) propoxy)propyl trimethylsilane

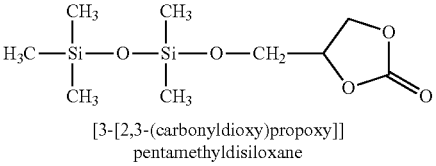
[3-[2,3-(carbonyldioxy)propoxy]] pentamethyldisiloxane

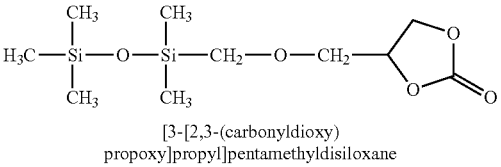
[3-[2,3-(carbonyldioxy) propoxy]propyl]pentamethyldisiloxane

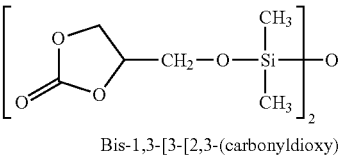
Bis-1,3-[3-[2,3-(carbonyldioxy) propoxy]] tetramethyldisiloxane

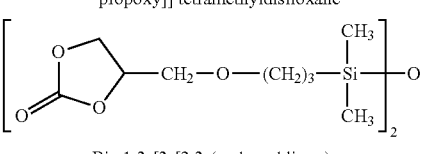
Bis-1,3-[3-[2,3-(carbonyldioxy) propoxy]propyl] tetramethyldisiloxane -continued

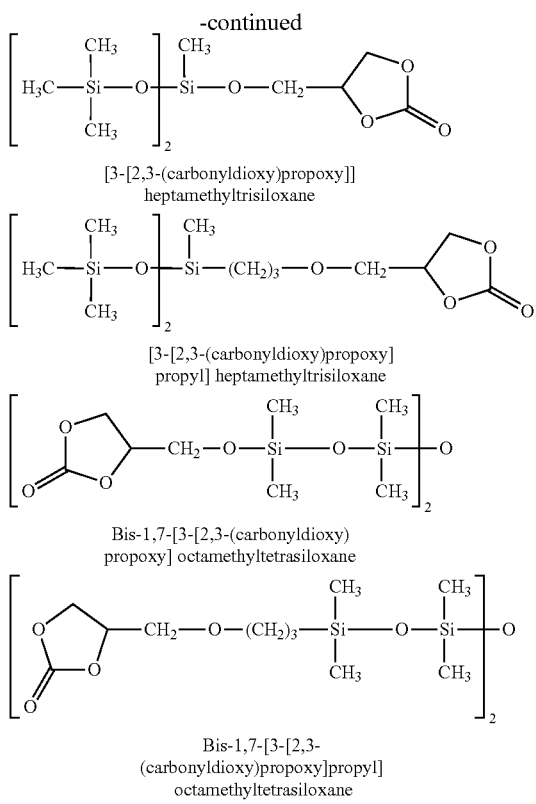

[3-[2,3-(carbonyldioxy)propoxy]]
heptamethyltrisiloxane

[3-[2,3-(carbonyldioxy)propoxy]
propyl] heptamethyltrisiloxane

Bis-1,7-[3-[2,3-(carbonyldioxy)
propoxy] octamethyltetrasiloxane

Bis-1,7-[3-[2,3-
(carbonyldioxy)propoxy]propyl]
octamethyltetrasiloxane or a mixture of any two or more thereof.

In another aspect, a method of forming a gel polymer electrolyte is provided including heating a composition as described above to an elevated temperature; holding at the composition at the elevated temperature for a specified time; and cooling the composition to ambient temperature. In some embodiments, the elevated temperature is from about 50° C. to about 120° C. In some such embodiments, the elevated temperature is from about 50° C. to about 110° C., from about 60° C. to about 110° C., from about 60° C. to about 100° C., from about 70° C. to about 100° C., from about 70° C. to about 90° C., or from about 75° C. to about 85° C. In some embodiments, the elevated temperature is 80° C. In some embodiments, the specified time is from 5 seconds to 10 minutes. In some such embodiments, the specified time is from about 1 to 10 minutes, from about 1 to 5 minutes, or from about 1 to 4 minutes, or from about 1 to 3 minutes, from about 1 to 2 minutes, from about 5 to 60 seconds, from about 5 to 50 seconds, from about 5 to 40 seconds, from about 5 to 30 seconds, from about 5 to 20 seconds, or from about 5 to 10 seconds.

In some embodiments, the method also includes dissolving an inorganic salt and a thermal initiator in an oligo(alkylene glycol)siloxane or an oligo(alkylene glycol)silane; mixing two or more acrylate terminated polyalkylether monomers (at least one as crosslinking agent and at least one as monofunctional monomeric compound) comprising either or both of an ethylene oxide unit and a propylene oxide unit as a monomeric unit in the resulting solution; adding radical promoter and rapidly mixing with the above resulted solution into a homogeneous solution; casting the resulting mixture onto the surface of the electrode; and heating the casted electrode until the electrode surface is solidified into a thin film. In some embodiments, the inorganic salt is a lithium salt.

In another aspect, an electrochemical cell is provided including the gel polymer electrolyte formed by the method of the previous two paragraphs and an electrode.

In another aspect, an electrochemical cell is provided including any of the above compositions and an electrode. In some embodiments, the electrochemical cell is a lithium primary battery, a lithium ion battery, a lithium air battery or a capacitor.

In another aspect, a method of assembling an electrochemical cell is provided including coating the surface of a positive electrode laminate and a negative electrode laminate with any of the above compositions; heating the positive and negative electrodes; stacking the positive electrode and the negative electrode to form the electrochemical cell; winding or folding the electrochemical cell to prepare a spiral wound cell or prismatic cell; and packaging the spiral wound or prismatic electrochemical cell in a metal can, a plastic pouch, or a laminated plastic/metal foil pouch.

In another aspect, a method of assembling an electrochemical cell is provided including coating any of the above compositions onto the surface of a porous supporter, a positive electrode laminate, and a negative electrode laminate; stacking the supporter, the positive electrode, and the negative electrode to form the electrochemical cell; winding or folding the electrochemical cell to prepare a spiral wound cell or a prismatic cell; gelling composition; and packaging the spiral wound or prismatic electrochemical cell in a metal can, a plastic pouch, or a laminated foil/plastic pouch.

In another aspect, a method of assembling an electrochemical cell is provided including stacking a porous supporter, a positive electrode laminate, and a negative laminate to form an electrochemical cell; winding or folding the electrochemical cell to prepare a spiral wound cell or a prismatic cell; packaging the spiral wound or prismatic electrochemical cell in a metal can, a plastic pouch, or a laminated metal foil/plastic pouch; injecting any of the above compositions into the metal can, plastic pouch, or laminated metal foil/plastic pouch; and gelling the composition.

DETAILED DESCRIPTION

Figure 1:
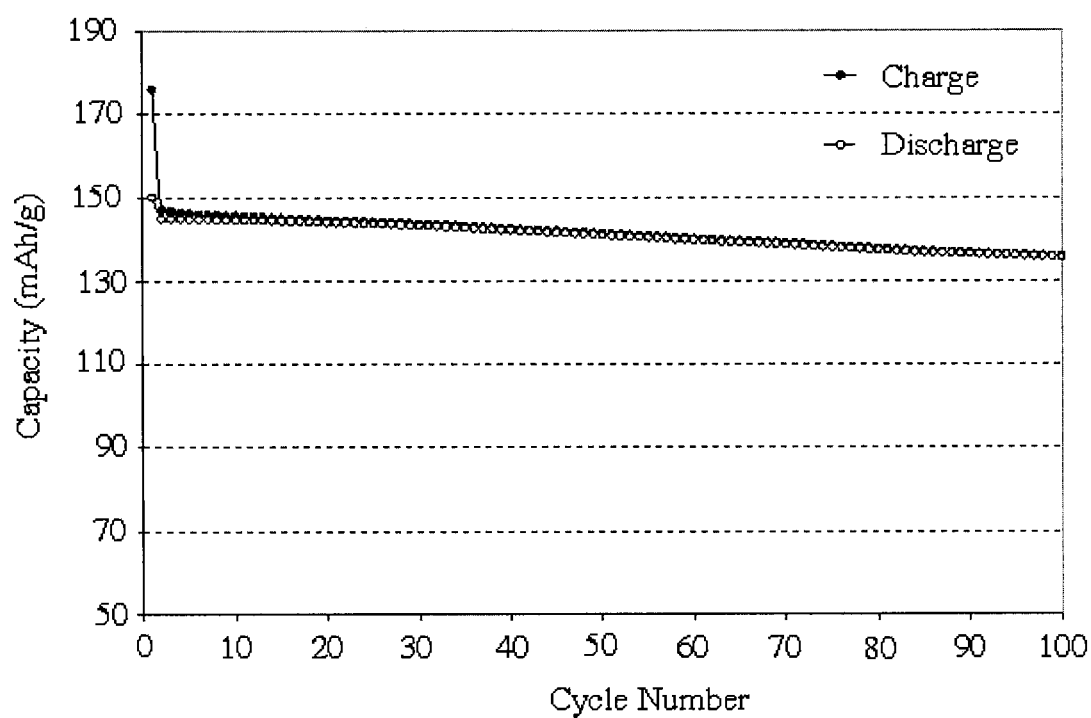
FIG. 1 is a graph of the cycling performance of a lithium ion cell using a fast-cured gel polymer electrolyte initiated by BPO/N,N-dimethylaniline, according to one embodiment.

Fast-curing gel polymer electrolytes are provided including Si-electrolyte trapped in a polymer matrix. Such gel polymer electrolytes may be free-standing and exhibit room temperature conductivity. In some embodiments, the fast-cure process utilizes an initiation system that incorporates a polymerization initiation promoter. At room temperature such initiator systems are relatively stable and can provide more than 12 hours of pot-life or shelf-life. At elevated temperatures, the initiator promoter accelerates the decomposition of the initiator to more quickly release the active species, thus leading to a gel polymer electrolyte that cures within seconds of being subjected to the elevated temperature. Such a combination of reactants leads to fast-cure gel polymer systems that avoid excessive times at high curing temperatures which can deleteriously lead to degradation of the gel electrolytes or the electrodes in an electrochemical cell in which the gel electrolyte is present.

Formation of the gel polymer electrolyte may be initiated by thermal, photo and/or UV initiator. Representative thermal initiators include, but are not limited to, an azo compound, a peroxide compound, bismaleimide, or a mixture of any two or more thereof Exemplary azo compounds include 1,1'-azobis (cyclohexanecarbonitrile), 2,2'-azobis(2-methylpropionamidine)dihydrochloride, 2,2'-azobis(2-methylpropionitrile), and 4,4'-azobis(4-cyanovaleric acid). Exemplary peroxide compounds include benzoylperoxide, 1,1-bis(tert-amylperoxy)cyclohexane, 1,1-bis(tert-butylperoxy)-3,3,5-trimethylcyclohexane, 1,1-bis(tert-butylperoxy)cyclohexane, 2,2-bis(tert-butylperoxy)butane, 2,4-pentanedione peroxide, 2,5-bis(tert-butylperoxy)-2,5-dimethylhexane, 2,5-di(tert-butylperoxy)-2,5-dimethyl-3-hexyne, 2-butanone peroxide, benzoyl peroxide, cumene hydroperoxide, di-tert-amyl peroxide, dicumyl peroxide, lauroyl peroxide, tert-butyl hydroperoxide solution, tert-butyl peracetate, tert-butyl peroxide, tert-butyl peroxybenzoate, and tert-butylperoxy 2-ethylhexyl carbonate. Alternatively, mixtures of any two or more such compounds may also be used.

Representative photoinitiators include, but are not limited to, 1-hydroxyl-phenyl-ketone, benzophenone, 2-hydroxyl-2-methyl-1-phenyl-propanone, 2-hydroxyl-1-[4-(2-hydroxy)phenyl]-2-methyl-1-propanone, methylbenzoylformate, oxy-phenyl-acetic acid 2-[2-oxo-2-phenyl-acetoxy-ethoxy]-ethyl ester, oxy-phenyl-acetic 2-[2-hydroxy-ethoxy]-ethyl ester, α,α-dimethoxy-α-phenylacetophenone, 2-benzyl-2-(dimethylamino)-1-[4-(4-morpholinyl)phenyl]-1-propanone, diphenyl(2,4,6-trimethylthio)phenyl)-phosphine oxide, phosphine oxide, phenyl bis(2,4,6-trimethyl benzoyl), bis(eta 5-2,4-cyclopentadien-1-yl)bis[2,6-difluoro-3-(1H-pyrrol-1-yl)phenyl]titanium, iodonium(4-methylphenyl)-[4-(2-methylpropyl)phenyl]-hexafluorophosphate, or a mixture of two or more thereof.

In some instances the photo-initiator is a UV initiator. Suitable initiators for UV curing include 2,2-dimethoxy-2-phenylacetophenone, 2-methoxy-2-phenylacetone, benzyldimethyl-ketal, ammoniumpersulfate, benzophenone, ethyl benzoin ether, isopropyl benzoin ether, a-methyl benzoin ether, benzoin phenyl ether, 2,2-diethoxyacetophenone, 1,1-dichloroacetophenone, 2-hydroxy-2-methyl-1-phenylpropane-1-one, 1-hydroxycyclohexyl phenyl ketone, anthraquinone, 2-ethyl anthraquitone, 2-chloroanthraquinone, thioxantone, isopropyl thioxantone, chlorothioxantone, 2,2-chlorobenzophenone, benzyl benzoate, benzoylbenzoate, or a mixture of any two or more such compounds.

In some embodiments, a reaction cure-promoter is added to a thermally initiated polymerization to expedite the cross-linking rate. The promoter causes the cure to complete, from start to finish, in about several seconds to several minutes, at elevated temperature. Representative radical promoters include, but not limited to, a tertiary amine compound, or a cobalt compound. The combination of a radical initiator and promoter can tremendously expedite the cross-linking process. At room temperature, the typical time for cure is on the order of several minutes. For example, the time for cure at room temperature may range from about 1 to 10 minutes, or from about 1 to 5 minutes, or from about 1 to 4 minutes, or from about 1 to 3 minutes, or from about 1 to 2 minutes, according to various embodiments. At elevated temperature, for example at 80° C., the typical time for cure in on the order of several seconds. For example, the time for cure at 80° C. may range from about 5 to 60 seconds, from about 5 to 50 seconds, from about 5 to 40 seconds, from about 5 to 30 seconds, from about 5 to 20 seconds, or from about 5 to 10 seconds, according to various embodiments.

Where the promoter is a tertiary amine, the amine may be, but is not limited to, N,N-dimethylaniline, N,N-diethylaniline, N,N-dimethyl-p-toluidine, N,N-dimethyl-m-toluidine, 4-N,N-dimethylamino phenethyl alcohol, 4-N,N-dimethylamino phenyl acetic acid, ethyl-4-dimethylamino benzoate, 4-N,N-dimethylaminobenzyl alcohol, 4-N,N-dimethylaminobenzyl methacrylate, or tertiary mono-, di-, or tri-aryl amines with electron donating substituents in the para position.

In some embodiments, a mixture of initiators with tertiary amines may be used. For example, a combination of benzoyl peroxide (BPO) and a tertiary amine is different from the conventional thermal initiation of BPO with respect to practical applications and chemical kinetics. The BPO/tertiary amine system has low activation energy and therefore it can initiate polymerization at room temperature as compared to conventional BPO decomposition, which occurs at 70° C. and above. The mechanism for the acceleration of BPO decomposition by tertiary amine starts with $S_N2$ nucleophilic displacement by the tertiary amine on the peroxide, yielding an intermediate adduct which finally forms benzoyloxy radical, benzoic acid and N-methylene radical.

Where the promoter is a cobalt compound, exemplary cobalt compounds include, but not limited to, cobalt naphthenate or cobalt octonate.

In some embodiments, the gel polymer electrolyte can be rapidly formed by high energy electron beam-initiated cross-linking reactions at room temperature.

In general, "substituted" refers to an organic group as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; ethers; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

Alkyl groups, as used herein, include straight chain and branched alkyl groups having from 1 to about 20 carbon atoms, and typically from 1 to 12 carbons or, in some embodiments, from 1 to 8, 1 to 6, or 1 to 4 carbon atoms. Alkyl groups further include cycloalkyl groups as defined below. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Representative substituted alkyl groups can be unsubstituted or substituted.

Cycloalkyl groups, as used herein, are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 3 to 6, or 3 to 7. Cycloalkyl groups further include mono-, bicyclic and polycyclic ring systems, such as, for example bridged cycloalkyl groups as described below, and fused rings, such as, but not limited to, decalinyl, and the like. In some embodiments, polycyclic cycloalkyl groups have three rings. Substituted cycloalkyl groups can be substituted one or more times with, non-hydrogen and non-carbon groups as defined above. However, substituted cycloalkyl groups also include rings that are substituted with straight or branched chain alkyl groups as defined above. Representative substituted cycloalkyl groups can be mono-substituted or substituted more than once, such as, but not limited to, 2,2-, 2,3-, 2,4- 2,5- or 2,6-disubstituted cyclohexyl groups, which can be substituted with substituents such as those listed above. Cycloalkyl groups can also be bridged cycloalkyl groups in which two or more hydrogen atoms are replaced by an alkylene bridge, wherein the bridge can contain 2 to 6 carbon atoms if two hydrogen atoms are located on the same carbon atom, or 1 to 5 carbon atoms, if the two hydrogen atoms are located on adjacent carbon atoms, or 2 to 4 carbon atoms if the two hydrogen atoms are located on carbon atoms separated by 1 or 2 carbon atoms. Bridged cycloalkyl groups can be bicyclic, such as, for example bicyclo[2.1.1]hexane, or tricyclic, such as, for example, adamantyl. Representative bridged cycloalkyl groups include bicyclo[2.1.1]hexyl, bicyclo[2.2.1]heptyl, bicyclo[3.2.1]octyl, bicyclo[2.2.2]octyl, bicyclo[3.2.2]nonyl, bicyclo[3.3.1]nonyl, bicyclo[3.3.2]decanyl, adamantyl, noradamantyl, bornyl, or norbornyl groups. Substituted bridged cycloalkyl groups can be unsubstituted or substituted one or more times with non-hydrogen and non-carbon groups as defined above. Representative substituted bridged cycloalkyl groups can be mono-substituted or substituted more than once, such as, but not limited to, mono-, di- or tri-substituted adamantyl groups, which can be substituted with substituents such as those listed above.

Alkenyl groups, as used herein, include straight and branched chain and cycloalkyl groups as defined above, except that at least one double bond exists between two carbon atoms. Thus, alkenyl groups have from 2 to about 20 carbon atoms, and typically from 2 to 12 carbons or, in some embodiments, from 2 to 8, 2 to 6, or 2 to 4 carbon atoms. In some embodiments, alkenyl groups include cycloalkenyl groups having from 4 to 20 carbon atoms, 5 to 20 carbon atoms, 5 to 10 carbon atoms, or even 5, 6, 7, or 8 carbon atoms. Examples include, but are not limited to vinyl, allyl, —CH=CH(CH$_3$), —CH=C(CH$_3$)$_2$, —C(CH$_3$)=CH$_2$, —C(CH$_3$)=CH(CH$_3$), CH=CHCH=CH$_2$, C(CH$_2$CH$_3$)=CH$_2$, cyclohexenyl, cyclopentenyl, cyclohexadienyl, butadienyl, pentadienyl, and hexadienyl, among others. Alkenyl groups may be substituted or unsubstituted. Representative substituted alkenyl groups can be mono-substituted or substituted more than once, such as, but not limited to, mono-, di- or tri-substituted with substituents such as those listed above.

Alkynyl groups, as used herein, include straight and branched chain alkyl groups, except that at least one triple bond exists between two carbon atoms. Thus, alkynyl groups have from 2 to about 20 carbon atoms, and typically from 2 to 12 carbons or, in some embodiments, from 2 to 8, 2 to 6, or 2 to 4 carbon atoms. Examples include, but are not limited to —C≡CH, —C≡(CH$_3$), —C≡C(CH$_2$CH$_3$), —CH$_2$C≡H, —CH$_2$C≡(CH$_3$) and —CH$_2$C≡(CH$_2$CH$_3$), among others. Alkynyl groups may be substituted or unsubstituted. Representative substituted alkynyl groups can be mono-substituted or substituted more than once, such as, but not limited to, mono-, di- or tri-substituted with substituents such as those listed above.

Aryl groups, as used herein, are cyclic aromatic hydrocarbons that do not contain heteroatoms. Aryl groups include monocyclic, bicyclic and polycyclic ring systems. Thus, aryl groups include, but are not limited to, cyclopentadienyl, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 5-14 carbons, and in others from 5 to 12 or even 6-10 carbon atoms in the ring portions of the groups. Although the phrase "aryl groups" includes groups containing fused rings, such as fused aromatic-aliphatic ring systems (e.g., indanyl, tetrahydronaphthyl, and the like), it does not include aryl groups that have other groups, such as alkyl or halo groups, bonded to one of the ring members. Rather, groups such as tolyl are referred to as substituted aryl groups. Aryl groups may be substituted or unsubstituted. Representative substituted aryl groups can be mono-substituted or substituted more than once. For example, monosubstituted aryl groups include, but are not limited to, 2-, 3-, 4-, 5-, or 6-substituted phenyl or naphthyl groups, which can be substituted with substituents such as those listed above.

Alkoxy groups, as used herein, are hydroxyl groups (—OH) in which the bond to the hydrogen atom is replaced by a bond to a carbon atom of a substituted or unsubstituted alkyl group as defined above. Examples of linear alkoxy groups include but are not limited to methoxy, ethoxy, propoxy, butoxy, pentoxy, hexoxy, and the like. Examples of branched alkoxy groups include but are not limited to isopropoxy, sec-butoxy, tert-butoxy, isopentoxy, isohexoxy, and the like. Examples of cycloalkoxy groups include but are not limited to cyclopropyloxy, cyclobutyloxy, cyclopentyloxy, cyclohexyloxy, and the like. Alkoxy groups may be substituted or unsubstituted. Representative substituted alkoxy groups can be substituted one or more times with substituents such as those listed above.

The terms "aryloxy" and "arylalkoxy," as used herein, refer to, respectively, a substituted or unsubstituted aryl group bonded to an oxygen atom and a substituted or unsubstituted aralkyl group bonded to the oxygen atom at the alkyl. Examples include but are not limited to phenoxy, naphthyloxy, and benzyloxy. Representative substituted aryloxy and arylalkoxy groups can be substituted one or more times with substituents such as those listed above.

In one aspect, a fast-cure method for gel polymer electrolyte formation is provided for electrochemical device applications such as lithium ion batteries, lithium air batteries and electric double-layer capacitors. In some embodiments, the gel polymer electrolyte is prepared from at least one oligo (alkylene glycol) substituted siloxane or silane; at least one cross-linking agent; at least one salt; at least one cross-linking initiator, at least one initiator promoter, and at least one electrode stabilizing additive. Without being bound by theory, it is believed that the conductivity of such gel polymers is due in part to oligo(alkylene glycol) groups that have an internally plasticizing effect, and their vigorous segmental motion imparted by the flexibility of the Si—O backbone. In some embodiments, the alkylene glycol moiety is derived from ethylene glycol, propylene glycol, or butylene glycol.

The gel polymer electrolyte includes oligo(alkylene glycol)-functionalized siloxanes or silanes as the ion-conducting phase. In one embodiment, the ion-conducting phase contains a siloxane or silane compound and a lithium salt. Such siloxanes or silanes include a silicon or silicon oxide group having four or less substituents that is an oligo(alkylene glycol), or cyclic carbonate moiety. The siloxanes or silanes may be include up to four such substituents. In some embodiments, where the siloxane or silane has less than four such substituents, the siloxane or silane may include substituents other than an oligo(alkylene glycol) or cyclic carbonate moiety. As used herein, a silane has a silicon atom that is bonded to hydrogen and/or carbon atoms, while a siloxane has at least two silicon atoms bonded to one oxygen atom (e.g. Si—O—Si).

In some embodiments, the oligo(alkylene glycol) substituted siloxanes or silanes are compounds of Formula I:

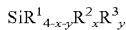   Formula I

In Formula I, each $R^1$ is individually an alkyl, alkenyl group, alkynyl group, alk(poly)enyl group, alk(poly)ynyl group, or aryl group, each of which may further include substituents such as aryl groups, alkoxy groups, or monovalent ether groups. In Formula I, $R^2$ is selected from Group I or Group II, and $R^3$ is selected from Group I or Group III. In Formula I, x is 1, 2, 3, or 4, and y is 0, 1, 2, or 3, where the sum of x and y is greater than or equal to one. Groups I, II, and III are:

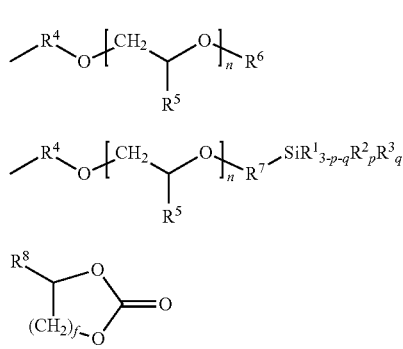

where $R^1$, $R^2$, and $R^3$ are as defined above; each $R^4$ is individually a bond or a divalent spacer; each $R^5$ and $R^6$ are individually hydrogen, alkyl, or aryl; each $R^7$ is individually alkyl or aryl; each $R^8$ is individually a divalent organic spacer; f is 1 or 2; n is an integer from 0 to 15; p is 0, 1, 2, or 3; and q is 0, 1, 2, or 3. In some embodiments, each of $R^1$, $R^2$, and $R^3$ are individually an alkyl group, alkenyl group, alkynyl group, alkoxy group, alk(poly)enyl group, alk(poly)ynyl group, or aryl group, each of which may further include substituents such as aryl groups, alkoxy groups, or monovalent ether groups. In some embodiments, n is an integer from 1 to 15. In other embodiments, $R^1$, $R^2$, and $R^3$ are individually an alkyl, aryl, or alkoxy group.

In some embodiments, the gel polymer electrolyte includes oligo(alkylene glycol)-functionalized siloxanes or silanes as the ion-conducting phase. In one embodiment, the ion-conducting phase contains a siloxane or silane compound and a lithium salt. Such siloxanes or silanes include a silicon or silicon oxide group having four or less substituents that is an oligo(alkylene glycol), or cyclic carbonate moiety. The siloxanes or silanes may be include up to four such substituents. In some embodiments, where the siloxane or silane has less than four such substituents, the siloxane or silane may include substituents other than an oligo(alkylene glycol) or cyclic carbonate moiety. In some embodiments, the alkylene glycol is an ethylene glycol, propylene glycol, or butylene glycol moiety.

In some embodiments, a siloxane includes a silicon linked to one side chain that includes an oligo(alkylene glycol) moiety, bonded to the silicon through an oxygen atom, and the silicon is bonded to three other substituents. For instance, the silane can be represented by Formula I where x is one, y is zero, $R^2$ is a Group I, and $R^4$ is a bond. In other embodiments, a silane includes a silicon linked to one side chain that includes an oligo(alkylene glycol) moiety, bonded to the silicon through an organic spacer group, and the silicon is bonded to three other substituents. For instance, the silane can be represented by Formula I where x is one, y is zero, $R^2$ is a Group I, and $R^4$ is other than a bond.

Exemplary compounds of Formula I, include, but are not limited to, Formulas I-A, I-B, I-C, I-D, I-E, and I-F:

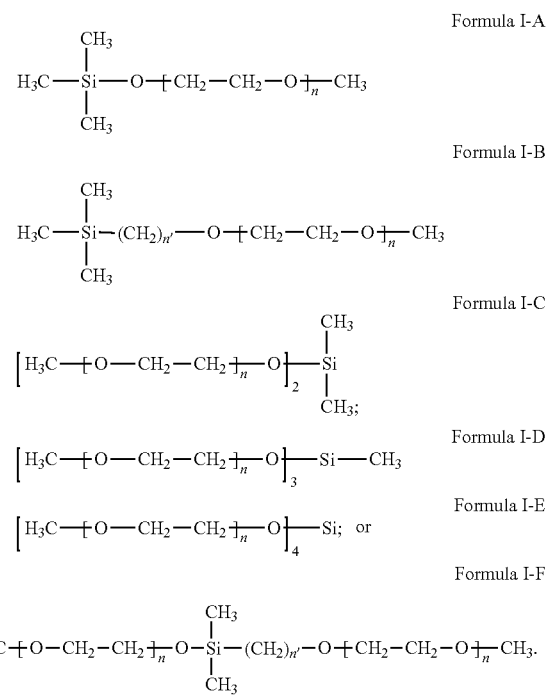

In Formulas I-A, I-B, I-C, I-D, I-E, and I-F each n is individually an integer from 1 to 15 (e.g. 1, 2, 3, 4, 5, 6, 7, 8, 9, 10, 11, 12, 13, 14, or 15). In some embodiments, each n is individually an integer from 2 to 15. In some embodiments, n is three. In some embodiments of Formulas I-A, I-B, I-C, I-D, I-E, and I-F, each n' is an integer selected from one, two, or three. In other embodiments, each n' is one or three.

In another embodiment, the ion conducting phase contains a disiloxane compound, dissolved with an inorganic salt. Suitable disiloxanes includes a backbone with a first silicon and a second silicon. The first silicon is linked to a first substituent that includes a oligo(alkylene glycol) moiety or a cyclic carbonate moiety. For instance, the first silicon can be selected from a group consisting of a first side-chain that includes a oligo(alkylene glycol) moiety, a first side-chain that includes a cyclic carbonate moiety or a cross-linker that includes a oligo(alkylene glycol) moiety which cross-links the disiloxane to a second siloxane. In some instances, the disiloxanes include no more than one oligo(alkylene glycol) moiety and/or no more than one cyclic carbonate moiety. For instance, the entities linked to the first silicon and the second silicon, other than the first substituent, can each exclude a oligo(alkylene glycol) moiety and/or a cyclic carbonate moiety. In some instances, the disiloxane excludes a oligo(alkylene glycol) moieties or excludes cyclic carbonate moieties. In some embodiments, the inorganic salt is a lithium salt.

The second silicon can be linked to a second substituent that is a second side-chain that includes a oligo(alkylene glycol) moiety and a second side-chain that includes a cyclic carbonate moiety. In some instances, the disiloxanes include no more than two oligo(alkylene glycol) moieties and/or no more than two cyclic carbonate moieties. For instance, the entities linked to the first silicon and the second silicon, in addition to the first substituent and the second substituent, can each include an oligo(alkylene glycol) moiety and/or a cyclic carbonate moiety.

In some embodiments, the disiloxanes are represented by Formula II:

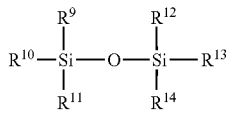

Formula II where $R^9$, $R^{12}$, $R^{11}$, and $R^{14}$ are individually an alkyl group or an aryl group; $R^{10}$ is an alkyl group, an aryl group, an oligo (alkylene glycol) group, or an alkylcyclic carbonate group; and $R^{13}$ is an alkyl group, an aryl group, an oligo(alkylene glycol) group, an alkylcyclic carbonate group, Group I, Group II, or Group III. In some embodiments, $R^{10}$ is selected from Group I, Group II, or Group III. In other embodiments, $R^{13}$ is an alkyl group, an aryl group, Group I, or Group III. In some embodiments, $R^{13}$ is selected from Group I or Group III. In some embodiments, $R^{10}$ is selected from an alkyl group, an aryl group, or Group I. In other embodiments, $R^{10}$ is an alkyl, an aryl, or Group III. In some embodiments, $R^9$, $R^{12}$, $R^{11}$, and $R^{14}$ are individually an alkyl group. For example, $R^9$, $R^{12}$, $R^{11}$, and $R^{14}$ may individually be a methyl, ethyl, n-propyl, iso-propyl, n-butyl, iso-butyl, or tert-butyl group. In some embodiments, $R^9$, $R^{12}$, $R^{11}$, and $R^{14}$ are each a methyl group.

In one example of the disiloxane, the first substituent is a side chain that includes a oligo(alkylene glycol) moiety. The oligo(alkylene glycol) moiety can include an oxygen linked directly to the first silicon. For instance, the disiloxanes can be represented by Formula II, where $R^{13}$ is a Group I, and $R^4$ is a bond. Alternately, a spacer can link the oligo(alkylene glycol) moiety to the first silicon. For instance, the disiloxanes can be represented by Formula II, where $R^{13}$ is Group I, and $R^4$ is a divalent organic moiety.

When the first substituent is a side chain that includes a oligo(alkylene glycol) moiety, each of the entities linked to the second silicon can be alkyl groups and/or aryl groups. For instance, the second substituent can be an alkyl group or an aryl group. In some embodiments, the disiloxane is a compound of Formula II, where $R^{13}$ is Group I, and $R^{10}$ is an alkyl group or an aryl group.

Exemplary compounds of Formula II, include, but are not limited to:

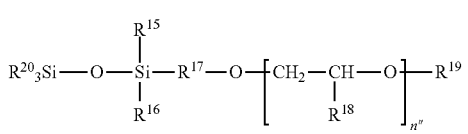

Formula II-A

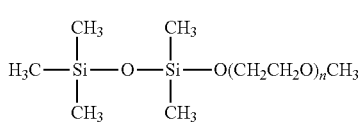

Formula II-B

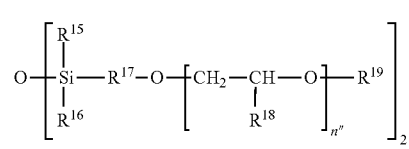

Formula II-C

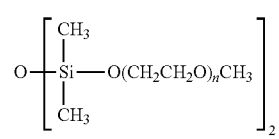

Formula II-D

In the above compounds of Formulas II-A, II-B, II-C, and II-D, each $R^{15}$ and $R^{16}$ are individually an alkyl group or an aryl group; each $R^{17}$ is a bond or a divalent spacer; each $R^{18}$ is individually a hydrogen atom or an alkyl group; each $R^{19}$ is individually an alkyl group; each $R^{20}$ is individually an alkyl or an aryl group; n is an integer from 0 to 15, and n" is an integer from 1 to 30. In some embodiments, n is an integer from 1 to 12. Where $R^{17}$ is a divalent spacer, it may be an organic divalent spacer, such as an alkylene, an alkylene glycol, or a bivalent ether group. For example, $R^{17}$ may be a moiety having one or more methylene groups. In some embodiments, $R^{17}$ is methylene, ethylene, propylene, or buylene. In one embodiment, $R^{17}$ is —(CH$_2$)$_3$—. In some embodiments, $R^{17}$ may be partially or completely halogenated. For instance, the above spacers can be completely or partially fluorinated. In some embodiments, each $R^{20}$ is individually an alkyl group. For example, each $R^{20}$ may individually be a methyl, ethyl, n-propyl, iso-propyl, n-butyl, iso-butyl, or tert-butyl group. In some embodiments, each $R^{23}$ is a methyl group. In one embodiment, each $R^{20}$ is a methyl, $R^{17}$ is —(CH$_2$)$_3$—; and $R^{18}$ is a hydrogen. In one embodiment, each $R^{20}$ is a methyl; $R^{17}$ is —(CH$_2$)$_3$—; and $R^{18}$ is a hydrogen; and n is 3. In some embodiments, n is 3.

In another embodiment, the oligo(alkylene glycol)siloxane is a trisiloxane compound. Some such trisiloxanes may be represented by Formula III:

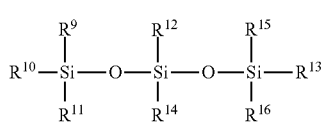

Formula III where $R^9$, $R^{11}$, $R^{12}$, $R^{14}$, $R^{15}$ and $R^{16}$ are individually an alkyl group or an aryl group; $R^{10}$ is an alkyl group, an aryl group, an oligo(alkylene glycol) group, or an alkylcyclic carbonate group; and $R^{13}$ is an alkyl group, an aryl group, an oligo (alkylene glycol) group, or an alkylcyclic carbonate group. In some embodiments, $R^{10}$ is selected from Group I, Group II, or Group III. In other embodiments, $R^{13}$ is an alkyl group, an aryl group, Group I, or Group III. In some embodiments, $R^{13}$ is selected from Group I or Group III. In some embodiments, $R^{10}$ is selected from an alkyl group, an aryl group, or Group I. In other embodiments, $R^{10}$ is an alkyl, an aryl, or Group III. In some embodiments, $R^9$, $R^{11}$, $R^{12}$, $R^{14}$, $R^{15}$ and $R^{16}$ are individually an alkyl group. For example, $R^9$, $R^{12}$, $R^{11}$, and $R^{14}$ may individually be a methyl, ethyl, n-propyl, iso-propyl, n-butyl, iso-butyl, or tert-butyl group. In some embodiments, $R^9$, $R^{11}$, $R^{12}$, $R^{14}$, $R^{15}$ and $R^{16}$ are each a methyl group.

Representative trisiloxanes of Formula III include, but are not limited to, those compounds described by Formulas III-A, III-B, III-C, and III-D.

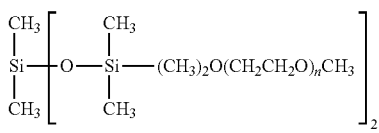

Formula III-A

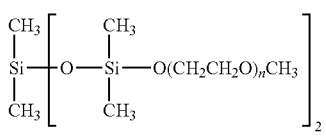

Formula III-B

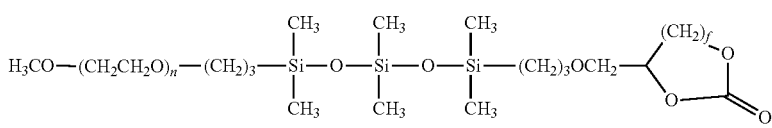

Formula III-C

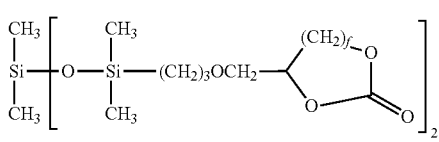

Formula III-D

In each of the formulas, each n is independently an integer from 1 to 12 and f is 1 or 2.

In each of Formulas III-A and III-B, a trisiloxane having terminal silicon atoms linked to a side chain that includes a poly(ethylene oxide) moiety are shown. Formula I-A illustrates an organic spacer positioned between each poly(ethylene oxide) moiety and the terminal silicon. Formula III-B illustrates each of the terminal silicon atoms linked directly to a poly(ethylene oxide) moiety. In each of Formulas III-C and III-D a trisiloxane with a terminal silicon linked to a side chain that includes a cyclic carbonate moiety are shown. Formula III-C illustrates one of the terminal silicon atom linked to a side chain that includes a cyclic carbonate moiety and one of the terminal silicon atoms linked to a side chain that includes a poly(ethylene oxide) moiety. Formula III-D illustrates each of the terminal silicon atoms linked to a side chain that includes a cyclic carbonate moiety.

In other embodiments, the trisiloxanes are compounds according to Formula IV.

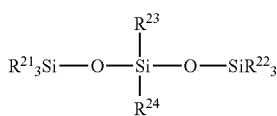

Formula IV where each $R^{21}$, $R^{22}$, and $R^{23}$ are individually an alkyl group or an aryl group; and $R^{24}$ is selected from Group I, Group II, or Group III.

Representative compounds of Formula IV include, but are not limited to compounds such as those of Formulas IV-A, IV-B, IV-C, and IV-D.

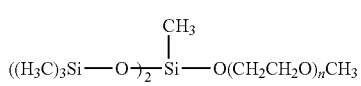

Formula IV-A

-continued

Formula IV-B

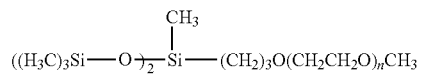

Formula IV-C

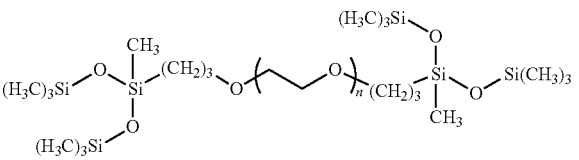

Formula IV-D

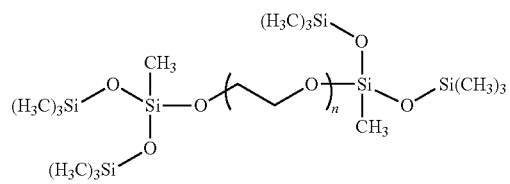

In each of the formulas, each n is independently an integer from 1 to 12.

Formula IV-A illustrates a trisiloxane where the central silicon atom is directly linked to a side chain that includes a poly(ethylene oxide). Formula IV-B illustrates a trisiloxane where the central silicon atom is linked to a side chain that includes a poly(ethylene oxide), through a spacer group. Formulas IV-C and IV-D illustrate trisiloxanes having a central silicon atom linked through a cross-link (e.g. the poly(alkylene oxide) moiety) joining the trisiloxane to a second trisiloxane. Formula IV-C illustrates the cross-link including a spacer positioned between the poly(alkylene oxide) moiety and each of the trisiloxanes. Formula IV-D illustrates a silicon atom in the backbone of each trisiloxane linked directly to a poly(alkylene oxide) moiety.

In some embodiments, the ion conductive phase includes a low concentration of a carbonate-based solvent. Suitable carbonate-based solvents include, but are not limited to, dimethyl carbonate, ethyl methyl carbonate, diethyl carbonate, methyl propyl carbonate, ethyl propyl carbonate, dipropyl carbonate, bis(trifluoroethyl)carbonate, bis(pentafluoropropyl)carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, perfluorobutyl ethyl carbonate, fluorinated oligomers, dimethoxyethane, triglyme, dimethylvinylene carbonate, tetraethyleneglycol, dimethyl ether, oligoethylene glycols, sulfones, sulfolane, γ-butyrolactone, or a mixture of any two or more thereof. As used herein, low concentration refers to a concentration that is less than 50 wt %. In some embodiments, low concentration refers to the carbonate-based solvent being present at from about 1 to 40 wt %, from about 2 to 35 wt %, from about 3 to 30 wt %, from about 4 to 25 wt %, or from about 5 to 20 wt %.

Suitable salts for use in the ionic conductive phase include, but are not limited to, alkali metal salts including lithium salts. Examples of lithium salts include $LiClO_4$, $LiBF_4$, $LiAsF_6$, $LiSbF_6$, $LiPF_6$, $LiCF_3SO_3$, $Li(CF_3SO_2)_2N$, $Li(CF_3SO_2)_3C$, $LiC_6F_5SO_3$, $LiAlCl_4$, $LiGaCl_4$, $LiSCN$, $LiO_2$, $LiCO_2CF_3$, $LiN(SO_2C_2F_5)_2$, lithium alkyl fluorophosphates, organoborate salts and mixtures thereof. In some embodiments, the salt is selected an organoborate salt such as a lithium bis(chelato)borates. Suitable lithium bis(chelato) borates include lithium bis(oxalato)borate (LiBOB) and lithium difluorooxalato borate (LiDfOB). Other suitable organoborate salts include those of formula:

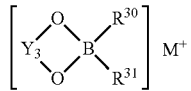

wherein $M^+$ is an alkaline, or alkaline earth metal ion; $Y_3$ is selected from the group consisting of $-CX(CR^{32}_2)_aCX-$, $-CZZ'(CR^{32}_2)_aCZZ'-$, $-CX(CR^{32}_2)_aCZZ'-$, $-SO_2(CR^{32}_2)_bSO_2-$, and $-CO(CR^{32}_2)_bSO_2-$; X is $=O$ or $=NR^{30}$, Z is alkyl, halogenated alkyl, $-C=NR^{30}$, $CR^{30}_3$ or $R^{32}$; Z' is alkyl, halogenated alkyl, $-C=NR^{30}$, $CR^{30}_3$ or $R^{30}$; $R^{32}$ is a halogen; $R^{31}$ is halogen or hydrogen; $R^{30}$ is hydrogen, alkyl, halogenated alkyl, cyano, or halogen; a is 0 to 4 and b is 1 to 4. In some embodiments, $M^+$ is an alkaline metal. In some other embodiments, $M^+$ is lithium. Z and Z' can be the same or different. Each $R^{32}$ may be the same or different. Each $R^{31}$ may be the same or different. Each $R^{30}$ may be the same or different. In an example of an organoborate salt, $Y_3$ is $-CX(CR^{32}_2)_aCX-$; each X is $=O$ and each $R^{32}$ is a halogen. In another example of the organoborate salt, $Y_3$ is $-CX(CR^{32}_2)_aCX-$ and each $R^{32}$ is fluorine.

The present inventive gel polymer electrolyte also contains a cross-linking agent and a monomer as a cross-linking density controller. According to one embodiment, the crosslinking agent is a monomer of Formula V or Formula VI:

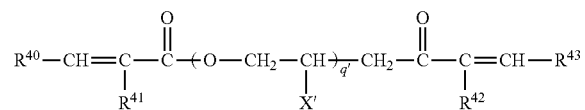

Formula V

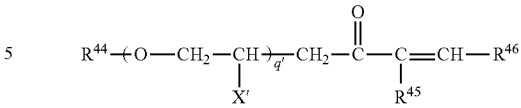

Formula VI where $R^{40}$, $R^{41}$, $R^{42}$, $R^{43}$, $R^{44}$, $R^{45}$, and $R^{46}$ are each independently hydrogen, an alkyl group having from 1 to 12 carbon atoms, or an alkenyl group having from 2 to 12 carbon atoms; X' is hydrogen, methyl, or ethyl; and q' is a whole number from 1 to 20.

In some embodiments, the cross-linking agent comprises of two components. The first component of the cross-linking agent is a partially substituted polymethylsiloxane precursor of Formula VII or Formula VIII, and the second component of the cross-linking agent is a polymer with 2 terminal groups containing unsaturated bond, such as those of Formula IX or Formula X.

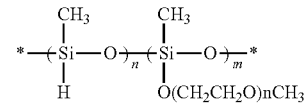

Formula VII

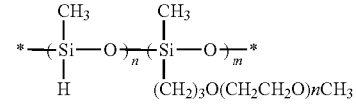

Formula VIII

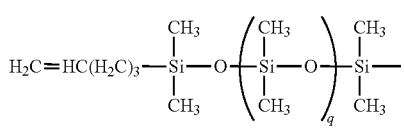

Formula IX

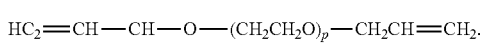

Formula X

In Formulas VII, VIII, IX and X, n and m are integers where the sum of n and m is from 10 to 500, from 20 to 300, from 30 to 100, or from 35 to 50; p is an integer from 2 to 20; and q is an integer from 4 to 35.

Generally, Formula VII and VIII are partially substituted polymethylhydrosiloxanes. The first component of the cross-linking agent, a partially substituted polymethylsiloxane precursor of Formula VII is synthesized by a tris(pentafluorophenyl)borane $B(C_6F_5)_3$-catalyzed dehydrogenation coupling reaction between polymethylhydrosiloxane (PMHS) and oligo(ethylene glycol) methyl ether. The precursor of Formula VIII is synthesized by a platinum-catalyzed hydrosilylation reaction between PMHS and allyl terminated oligo(ethylene glycol) methyl ether.

In some embodiments, the ratio of n/m is from 1:4 to 1:200, 1:4 to 1:50, or 1:4 to 1:30. Generally, Formula IX is a polysiloxane crosslinker. Generally, Formula X is a PEO cross-linking agent. Cross-linking reactions with compounds of Formulas VII, VIII, IX and X may be initiated by a platinum catalyzed hydrosilylation reaction at elevated temperature. In some embodiments, platinum catalyst is a Pt(0) complex with divinyltetramethyldisiloxane or $H_2PtCl_6$.

In some embodiments, the oligo(alkylene glycol) functionalized siloxane/silane is present from about 5 wt % to about 80 wt %, where the wt % is calculated on the total weight of the at least one oligo(alkylene glycol) functionalized siloxane/silane, the at least one crosslinking agent, the at least one monofunctional monomeric compound, the at least one salt, the at least one radical reaction initiator, and the at least one radical initiator promoter. In some such embodiments, the oligo(alkylene glycol) functionalized siloxane/silane is present from about 40 wt % to about 80 wt %. In other such embodiments, the oligo(alkylene glycol) functionalized siloxane/silane is present from about 60 wt % to about 70 wt %.

In some embodiments, the crosslinking agent is present from about 10 wt % to about 50 wt %, wherein the wt % is calculated on the total weight of the at least one oligo(alkylene glycol) functionalized siloxane/silane, the at least one crosslinking agent, the at least one monofunctional monomeric compound, the at least one salt, the at least one radical reaction initiator, and the at least one radical initiator promoter. In some such embodiments, the crosslinking agent is present from about 10 wt % to about 20 wt %.

In some embodiments, the monofunctional monomeric compound is present from about 10 wt % to about 50 wt %, wherein the wt % is calculated on the total weight of the at least one oligo(alkylene glycol) functionalized siloxane/silane, the at least one crosslinking agent, the at least one monofunctional monomeric compound, the at least one salt, the at least one radical reaction initiator, and the at least one radical initiator promoter. In some such embodiments, the monofunctional monomeric compound is present from about 10 wt % to about 20 wt %.

In some embodiments, the at least one salt is a lithium salt. In some such embodiments, the lithium salt is $LiClO_4$, $LiBF_4$, $LiAsF_6$, $LiPF_6$, $Li[PF_2(C_2O_4)_2]$, $Li[PF_4(C_2O_4)]$, $Li[CF_3SO_3]$, $Li[N(CF_3SO_2)_2]$, $Li[C(CF_3SO_2)_3]$, $Li[N(SO_2C_2F_5)_2]$, a lithium alkyl fluorophosphate, $Li[B(C_2O_4)_2]$, $Li[BF_2(C_2O_4)]$, or a mixture of any two or more thereof. In some embodiments, the at least one salt is a tetraalkylammonium salt selected from $[NR^{50}_4][CF_3SO_3]$, $[NR^{50}_4][N(CF_3SO_2)^{2-}]$, $[NR^{50}_4][BF_4^-]$, $[NR^{50}_4][PF_6^-]$, $[NR^{50}_4][AsF_6^-]$, or a mixture of any two or more of hereof, where each $R^{50}$ is individually an alkyl having from 1 to 12 carbon atoms.

In some embodiments, a molar ratio of the lithium salt relative to a total molar concentration of silane or siloxane in the total mixture of cross-linking precursors containing at least one oligo(ethylene)oxide siloxane/silane, the at least one crosslinking agent, the at least one monofunctional monomeric compound, the at least one radical reaction initiator, and the at least one radical reaction initiator promoter In some embodiments, a molar ratio of the tetraalkylammonium salt relative to a total molar concentration of ethylene oxide in the total mixture of cross-linking precursors containing at least one poly(ethylene)oxide siloxane, the at least one crosslinking agent, the at least one monofunctional monomeric compound, and the at least one radical reaction initiator promoter.

In another embodiment, a silicon-containing compound with carbonate group is added during the formation of the gel polymer electrolyte as an electrode stabilizing additive. Suitable electrode stabilizing additives include, but are not limited to,

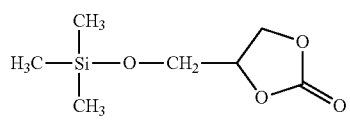

3-(2,3-(carbonyldioxy)propoxy) trimethylsilane

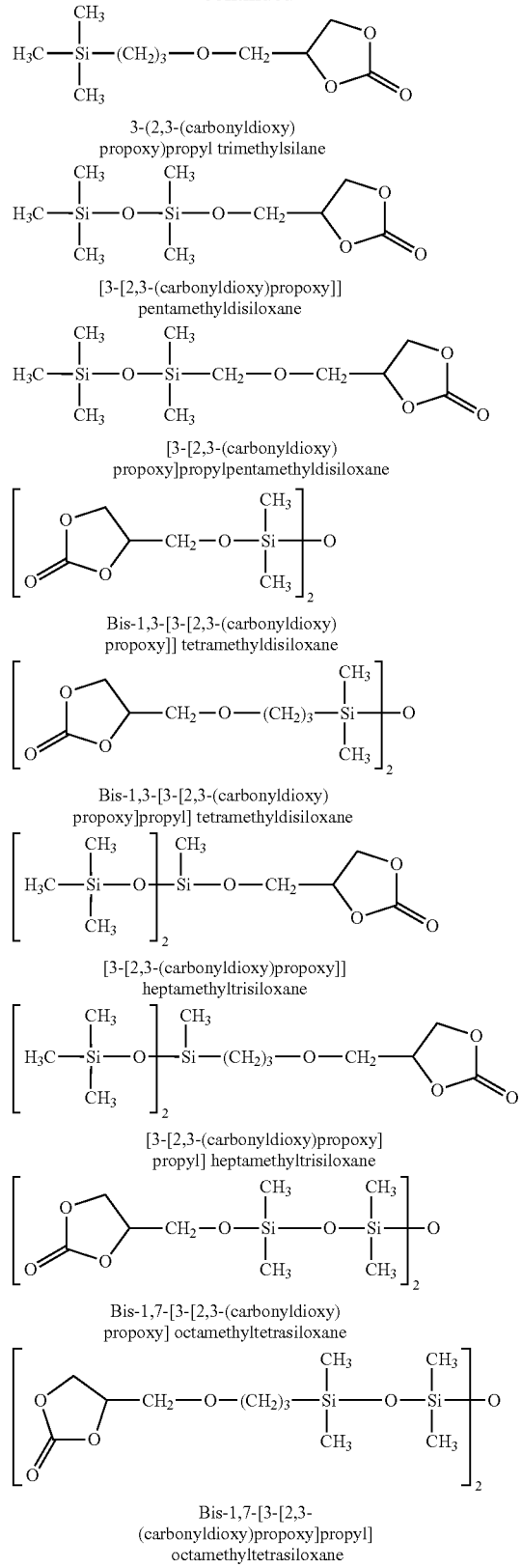

or a mixture of any two or more thereof.

In some embodiments, other electrolyte additives may also be present. In some embodiments, each electrolyte additive is present at a concentration of about 0.001 to about 15 wt % of the overall gel electrolyte weight. Such other electrolyte additives may include, but are not limited to pyridazine, vinyl pyridazine, quinoline, vinyl quinoline, pyridine, vinyl pyridine, indole, vinyl indole, triethanolamine, 1,3-dimethyl butadiene, butadiene, vinyl ethylene carbonate, vinyl carbonate, imidazole, vinyl imidazole, piperidine, vinyl piperidine, pyrimidine, vinyl pyrimidine, pyrazine, vinyl pyrazine, isoquinoline, vinyl isoquinoline, quinoxaline, vinyl quinoxaline, biphenyl, 1,2-diphenyl ether, 1,2-diphenylethane, o-terphenyl, N-methyl pyrrole, naphthalene, 3,9-divinyl-2,4,8,10-tetraoxaspiro[5.5]undecane, 3,9-divinyl-2,4,8-trioxaspiro[5.5]undecane, 3,9-divinyl-2,4-dioxaspiro[5.5]undecane, 3,9-diethylidene-2,4,8,10-tetraoxaspiro[5.5]undecane, 3,9 diethylidene-2,4,8-trioxaspiro[5.5]undecane, 3,9-diethylidene-2,4-dioxaspiro[5.5]undecane, 3,9-dimethylene-2,4,8,10-tetraoxaspiro[5.5]undecane, 3,9-divinyl-1,5,7,11-tetraoxaspiro[5.5]undecane, 3,9-dimethylene-1,5,7,11-tetraoxaspiro[5.5]undecane, 3,9 diethylidene-1,5,7,11-tetraoxaspiro[5.5]undecane, or a mixture of any two or more thereof Lithium(chelato)borates such as $LiB(C_2O_4)_2$ and $LiBF_2C_2O_4$, or lithium(chelato)phosphates such as $LiPF_2(C_2O_4)_2$ and $LiPF_4C_2O_4$ may also be used as the lithium salt, or as an electrode stabilizing additive. Thus, in some embodiments, the lithium salt may be other than $Li[B(C_2O_4)_2]$, $Li[BF_2(C_2O_4)]$, $LiPF_4C_2O_4$ or $Li[PF_2(C_2O_4)_2]$; and the gel polymer electrolyte may include, as an electrode stabilizing additive, $Li[B(C_2O_4)_2]$, $Li[BF_2(C_2O_4)]$, $Li[PF_2(C_2O_4)_2]$, $LiPF_4C_2O_4$ or a mixture of two or more thereof, at, e.g., about 0.001 to about 10 wt %. In some other embodiments, the lithium salt may be other than $Li_2B_{12}X_{12-s}H_s$(X=OH, F, Cl, Br . . . and s ranges from 0 to 12) or $Li_2B_{10}X_{10-s}H_s$(X=OH, F, Cl, Br . . . and s ranges from 0 to 10); and the electrolyte may include, as a electrolyte additive, $Li_2B_{12}X_{12-s}H_s$(X=OH, F, Cl, Br . . . and s ranges from 0 to 12), $Li_2B_{10}X_{10-s}H_s$(X=OH, F, Cl, Br . . . and s ranges from 0 to 10) or a mixture of two or more thereof, at, e.g., about 0.001 to about 15 wt % for overcharge protection of lithium air cells.

The preparation of the gel electrolytes may be accomplished via a number of methods. For example, in one such embodiment, a method for preparing a gel electrolyte, comprises the steps of: dissolving a lithium salt and a thermal initiator in a, oligo(ethylene glycol)silane or an oligo(ethylene)glycol siloxane; mixing two or more acrylate terminated polyalkylether monomers (at least one as crosslinking agent and at least one as monofunctional monomeric compound) comprising either or both of an ethylene oxide unit and a propylene oxide unit as a monomeric unit in the resulting solution; adding radical promoter and rapidly mixing with the above resulted solution into a homogeneous solution; casting the resulting mixture onto the surface of the electrode, and heating the casted electrode until the electrode surface is solidified into a thin film.

In an alternative method, a substrates can be used in such methods which is a porous medium such as a polyolefin separator, a polyolefin nonwoven type separator, a polycarbonate microporous membrane, or the surface of an electrode. Substrates may be used to reduce the thickness of gel electrolytes necessary for device fabrication, and provide additional structural content to the device and electrode separation. The final thickness of the gel polymer electrolyte with or without an individual substrate may be below about 100 μm and greater than 1 μm. In some cases the final thickness of the gel electrolyte on an individual substrate may be from about 1 μm to about 100 μm, from about 1 μm to about 90 μm, from about 1 μm to about 80 μm, from about 1 μm to about 70 μm, from about 1 μm to about 60 μm, from about 1 μm to about 50 μm, from about 5 μm to about 100 μm, from about 5 μm to about 50 μm, from about 10 μm to about 100 μm, or from about 10 μm to about 50 μm.

In another aspect, an electrochemical cell is provided including the gel polymer electrolyte disclosed herein and at least one electrode. In some embodiments, the electrochemical cell is a lithium-ion rechargeable cell. In other embodiments, the electrochemical cell is a capacitor. In other such embodiments, the capacitor is a double layer electrochemical capacitor. Other exemplary electrochemical cells include lithium primary batteries, lithium ion batteries, lithium air batteries and super-capacitors.

Electrochemical cells may be assembled by a variety of methods. In one embodiment, such a method includes: coating the surface of a positive electrode laminate, and a negative electrode laminate by the cross-linking precursor mixture, wherein the cross-linking precursor mixture comprises at least one oligo(ethylene glycol) functionalized siloxane/silane; at least one crosslinking agent; at least one monofunctional monomeric compound; at least one salt; at least one radical reaction initiator, and at least one radical initiator promoter; heating the coated electrode into gel electrolyte; stacking the coated positive electrode laminate, and the coated negative electrode laminate to form an electrochemical cell; winding or folding the stacked electrochemical cell to prepare a spiral wound cell type or prismatic cell type; and packaging the spiral wound or prismatic electrochemical cell in a metal can, a plastic pouch, or a laminated plastic/metal foil pouch. Such stacking, winding and packaging are well known in the art.

Another embodiment, a method for assembling an electrochemical cell with a gel polymer electrolyte includes: coating a gel electrolyte solution onto the surface of a porous supporter, a positive electrode laminate, and a negative electrode laminate, wherein the gel electrolyte solution comprises at least one oligo(alkylene glycol)silane or an oligo(alkylene glycol)siloxane; at least one crosslinking agent; at least one monofunctional monomeric compound; at least one salt; at least one radical reaction initiator; and at least one radical initiator promoter; stacking the coated supporter, the coated positive electrode laminate, and the coated negative electrode laminate to form an electrochemical cell; winding or folding the electrochemical cell to prepare a spiral wound cell type or a prismatic cell type; gelling the solution to form the gel electrolyte; and packaging the spiral wound or prismatic electrochemical cell in a metal can, a plastic pouch, or a laminated foil/plastic pouch.

In another embodiment, a method for assembling an electrochemical cell with a gel polymer electrolyte includes: stacking a porous supporter, a positive electrode laminate, and a negative laminate to form an electrochemical cell; winding or folding the electrochemical cell to prepare a spiral wound cell type or a prismatic cell type; putting the spiral wound or prismatic electrochemical cell in a metal can, a plastic pouch, or a laminated metal foil/plastic pouch; injecting a crosslinking mixture solution into the spiral wound or prismatic electrochemical cell in the metal can, plastic pouch, or laminated metal foil/plastic pouch, wherein the gel electrolyte solution comprises at least one oligo(alkylene glycol) functionalized siloxane/silane; at least one crosslinking agent; at least one monofunctional monomeric compound; at least one salt; at least one radical reaction initiator; and at least one radical initiator promoter; and gelling the solution to form a gel electrolyte.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

The use of the terms "a" and "an" and "the" and similar referents in the context of describing the elements (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential to the practice of the invention.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Additionally the phrase "consisting essentially of" will be understood to include those elements specifically recited and those additional elements that do not materially affect the basic and novel characteristics of the claimed invention. The phrase "consisting of" excludes any element not specifically specified. In addition, where features or aspects of the disclosure are described in terms of Markush groups, those skilled in the art will recognize that the disclosure is also thereby described in terms of any individual member or subgroup of members of the Markush group.

One skilled in the art will readily realize that all ranges discussed can and do necessarily also describe all subranges therein for all purposes and that all such subranges also form part and parcel of this invention. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present invention, thus generally described, will be understood more readily by reference to the following examples, which are provided by way of illustration and are not intended to be limiting of the present invention.

EXAMPLES

Example 1

Fast-curing gel polymer electrolyte. General procedure of experiment includes the following steps: preparation of cross-linkable precursor containing the oligo(ethylene glycol) functionalized siloxane/silane, lithium salt, cross-linking polymer, monomer, radical initiator, and radical initiator promoter. Cross-linkable precursor solution casting onto the surface of the electrode; Initiation of the cross-linking reaction on the surface of electrode and in a 10 mL glass vial and recording of cure time.

Method A:

In an Argon filled glove box, 2.1 g of a mixture of 1.2M LiTFSI in Formula I-A (n=3) was mixed with poly(ethylene glycol)dimethacrylate (0.45 g; average $M_n$ of 450 g/mol) and poly(ethylene glycol)methyl methacrylate (0.45 g; average $M_n$ of 500 g/mol). To the resulting was added BPO (or AIBN) (0.0075 g), followed by stirring with a magnetic bar until completely dissolved. AIBN is an abbreviation for 2,2'-azobis (2-methylpropionitrile)

Method B:

In an Argon filled glove box, 2.1 g of a mixture of 1.2M LiTFSI in Formula I-A (n=3) mixed with poly(ethylene glycol)dimethacrylate (0.45 g; average $M_n$ of 450 g/mol) and poly(ethylene glycol)methyl methacrylate (0.45 g; average $M_n$ of 500 g/mol). To the resulting was added BPO (0.0075 g), followed by stirring with a magnetic bar until completely dissolved. To the completely dissolved solution was injected N,N-dimethylaniline (3 μL) with vigorous stirring at room temperature, resulting a homogenous cross-linking precursor solution.

Method C:

In an Argon filled glove box, 2.1 g of a mixture of 1.2M LiTFSI in Formula I-A (n=3) was mixed with poly(ethylene glycol)dimethacrylate (0.90 g; average $M_n$ of 450 g/mol). To this solution was added 2,2-dimethoxy-2-phenylacetophenone (DMPAP, 0.06 g) and the mixture stirred until completely dissolved. This cross-linkable solution was then subjected to UV-initiated polymerization.

Curing Test:

Table 1 illustrates that combinations of radical initiator and promoter cause the gel polymer to form within one minute, as opposed to two hour without a radical initiator and promoter.

TABLE I

Cure Times For Example 1 Methods.

| Method | Liquid Phase % | Cross-linked Polymer Wt % | Monomer Wt % | Initiator | Initiator Promoter | Cure Time |
|---|---|---|---|---|---|---|
| A | 70 | 15 | 15 | BPO | | 120 min |
| A | 70 | 15 | 15 | AIBN | DMA | <1 min |
| B | 70 | 15 | 15 | BPO | DMA | 1 min |
| C | 70 | 30 | 0 | DMPAP | | 125 min |

Example 2

Conductivity Measurement for Gel Polymer Electrolytes.

Gel polymer electrolyte was prepared using the same composition as in Example 1, Method B for conductivity measurements. A 2032 button coin cell was assembled with a PTFE O-ring filled with cross-linkable precursor and sandwiched between two stainless steel discs. After 5 minutes heating at 80° C. to transform the precursor solution into solid gel polymer electrolyte, the coin cell was connected with AC impedance spectrometer for impedance measurement with a frequency range from 1 MHz to 10 Hz.

The conductivity data are listed in Table 2. As shown in Table 2, the fast-cured gel polymer electrolyte has comparable conductivity as the regular gels formed with longer cure time, which is above $3\times10^{-4}$ S/cm (siemens/cm) at room temperature. Liquid phase selection also gives difference in conductivity; generally speaking the compound of Formula I-A has a higher conductivity than the compounds of Formula I-B, where n is the same for both compounds.

TABLE 2

Conductivities of Fast-Cured Gel Polymer Electrolytes

| Expt. No. | Liquid Phase | Crosslinking Polymer/ monomer | Liquid Phase Wt % | Initiator | Initiator Promoter | Conductivity ($\times10^{-4}$ S/cm) |
|---|---|---|---|---|---|---|
| A | 1.2M LiTFSI Formula I-A (n = 3) | 50/50 | 70 | BPO | | 3.57 |
| B | 1.2M LiTFSI Formula I-A (n = 3) | 50/50 | 70 | BPO | DMA | 3.50 |
| C | 1.2M LiTFSI Formula I-A (n = 3) | 50/50 | 70 | AIBN | DMA | 3.52 |
| D | 0.8M LiBOB Formula I-A (n = 3) | 50/50 | 70 | BPO | DMA | 2.50 |
| E | 0.8M LiBOB Formula I-B (n = 3) | 50/50 | 70 | BPO | DMA | 2.23 |
| F | 1.2M LiBOB Formula I-B (n = 3) | 100/0 | 70 | BPO | | 1.20 |

Example 3

Lithium Ion Cell Performance.

A 2032 button coin cell was assembled with MCMB graphite as an anode, fast-cured gel polymer electrolyte of Example 1, Method B and $LiNi_{1/3}Mn_{1/3}Co_{1/3}O_2$ as a cathode laminate electrode, and an MCMB anode. The method of assembling the cell includes coating the precursor solution of Example 1, Method B onto the cathode laminate electrode; curing the precursor solution to gel polymer electrolyte at 80° C. for 5 min.; stacking gel solid polymer electrolyte and the anode; placing a spring and cover to the enclose the stacked components to 2032 button cell; and crimping.

FIG. 1 illustrates the capacity retention of an MCMB/$LiNi_{0.8}Co_{0.15}Al_{0.05}O_2$ lithium-ion cell using the fast-cure gel electrolyte prepared from 15 wt % poly(ethylene glycol)dimethacrylate, 15 wt % poly(ethylene glycol)methyl ether methacrylate, 70 wt % silane electrolyte and 0.25 wt % BPO/N,N-dimethylaniline. The silane electrolyte used was 1.2M LiTFSI dissolved in purified 1NM3. The cell showed no capacity fade up to 100 cycles.

Example 4

Electric Double Layer Capacitor Performance.

A 2032 button coin cell was assembled as in Experiment 3, except that cathode and anode were replaced by two activated carbon electrodes.

Figure 2:
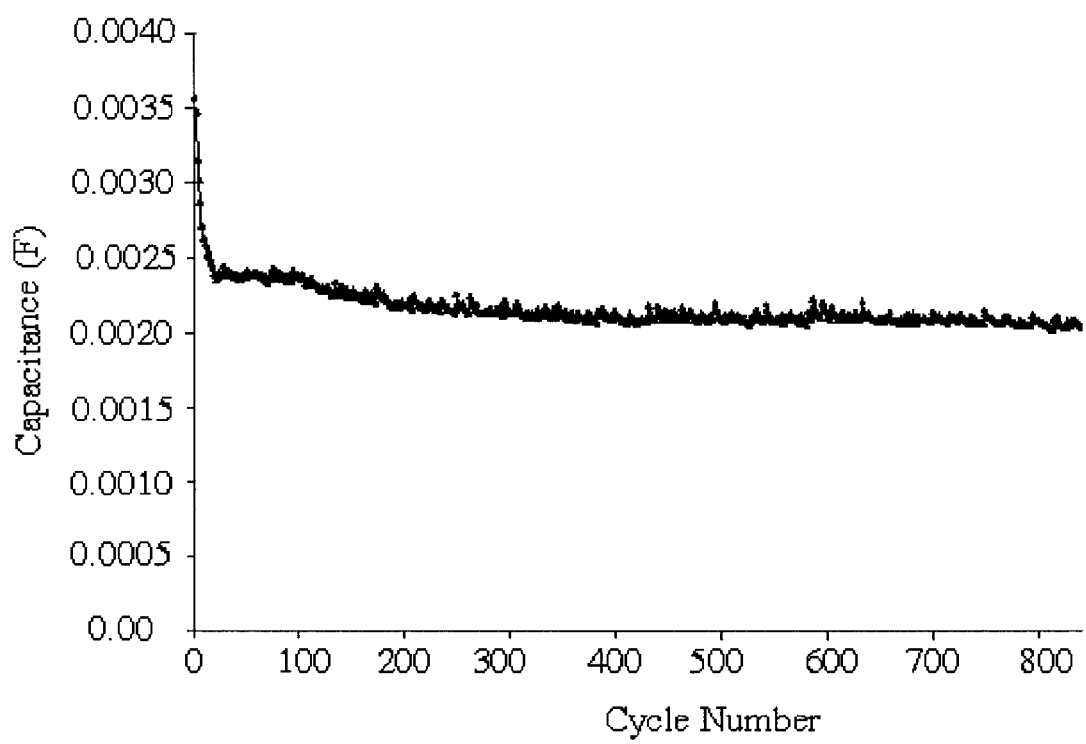
FIG. 2 is a graph of the cycling performance of an electric double-layer capacitor (EDLC) with a fast-cured gel polymer electrolyte initiated by BPO/N,N-dimethylaniline, according to an embodiment.

FIG. 2 illustrates the capacity retention of a carbon/carbon double layer electrochemical capacitor using the fast-cure gel electrolyte prepared from 15 wt % poly(ethylene glycol)dimethacrylate, 15 wt % poly(ethylene glycol)methyol ether methacrylate, 70 wt % silane electrolyte and 0.25 wt % BPO/N,N-dimethylaniline. The inventive silane electrolyte used is 1.2M LiTFSI dissolved in purified 1NM3. The cell was cycled between 0 to 3.0 V. Excellent capacity retention was obtained for 1000 cycles.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A composition for forming a fast-cure gel polymer electrolyte comprising:

an oligo(alkylene glycol) silane or an oligo(alkylene glycol) siloxane;

a cross-linking agent that is:

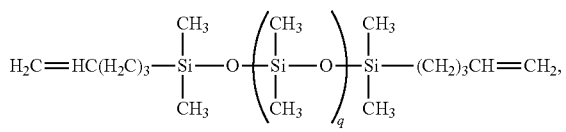

wherein q is an integer from 4 to 35;
a second cross-linking agent that is a compound of Formula VII, VIII, or X:

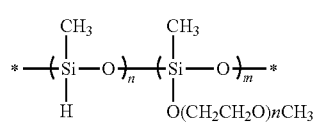
Formula VII

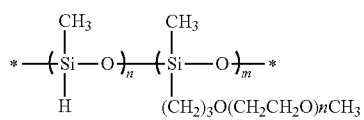
Formula VIII

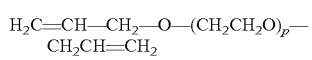
Formula X wherein:
n and m are integers, and where sum of n and m is from 10 to 500;
p is an integer from 2 to 20; and
the ratio of n/m is from 1:4 to 1:200;
a salt;
a cross-linking initiator;
an initiator promoter; and
an electrode stabilizing additive.

2. The composition of claim 1, wherein the oligo(alkylene glycol) silane is an oligo(ethylene glycol) silane, oligo(propylene glycol) silane, or oligo(butylene glycol) silane.

3. The composition of claim 1, wherein the oligo(alkylene) glycol siloxane is an oligo(ethylene glycol) siloxane, oligo(propylene glycol) siloxane, or oligo(butylene glycol) siloxane.

4. The composition of claim 1, wherein the oligo(alkylene glycol) silane is a compound of Formula I:

$SiR^1_{4-x-y}R^2_xR^3_y$  Formula I wherein:
each $R^1$ is individually an alkyl group, alkenyl group, alkynyl group, alk(poly)enyl group, alk(poly)ynyl group, or aryl group;
each $R^2$ is individually a group of Group I or Group II;
each $R^3$ is individually a group of Group I or Group III;
x is 1, 2, 3, or 4;
y is 0, 1, 2, or 3;
the sum of x and y is greater than or equal to one;

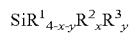
Group I

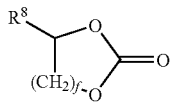
Group II

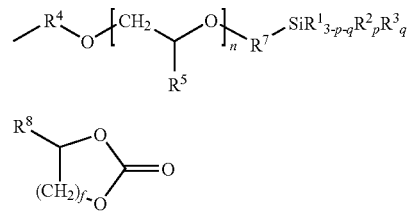
Group III each $R^4$ is individually a bond or a divalent spacer;
each $R^5$ and $R^6$ are individually hydrogen, alkyl, or aryl;
each $R^7$ is individually alkyl or aryl;
$R^8$ is a divalent organic spacer;
f is 1 or 2;
n is an integer from 0 to 15;
p is 0, 1, 2, or 3; and
q is 0, 1, 2, or 3.

5. The composition of claim 4, wherein $R^8$ is a divalent spacer that is a alkylene, alkylene glycol, or bivalent ether group.

6. The composition of claim 4, wherein x is one and y is zero.

7. The composition of claim 4, wherein $R^2$ is a group of Group I; and $R^4$ is a bond.

8. The composition of claim 4, wherein $R^4$ is other than a bond.

9. The composition of claim 4, wherein x is one; y is zero; $R^2$ is a moiety that is Group I; and $R^4$ is a bond.

10. The composition of claim 4, wherein x is one; y is zero; $R^2$ is a moiety that is Group I; and $R^4$ is other than a bond.

11. The composition of claim 4, wherein the compound of Formula I is:

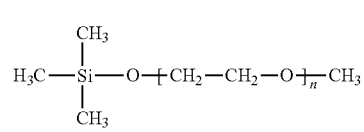
Formula I-A

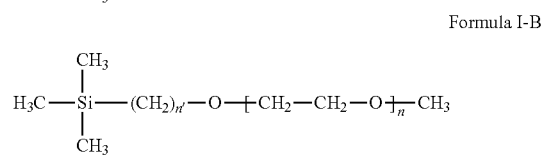
Formula I-B

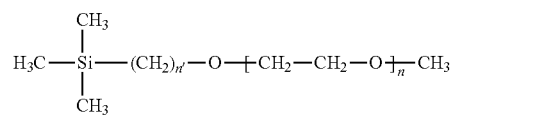
Formula I-C

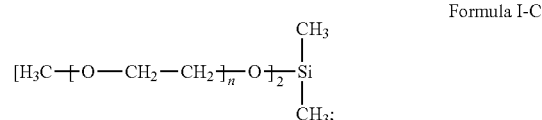
Formula I-D

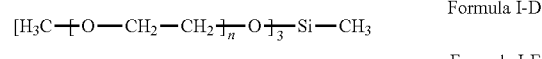
Formula I-E

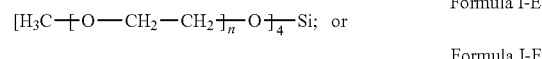
Formula I-F

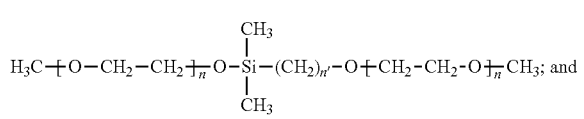

each n is individually an integer from 1 to 15; and
each n' is individually 1, 2, or 3.

12. The composition of claim 1, wherein the oligo(alkylene glycol)siloxane is a disiloxane represented by Formula II:

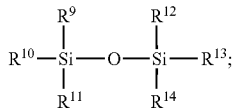

Formula II wherein:

$R^9$, $R^{12}$, $R^{11}$, and $R^{14}$ are individually an alkyl group or an aryl group; and each of $R^{10}$ and $R^{13}$ are individually an alkyl group, an aryl group, or a group of Group I, Group II, or Group III;

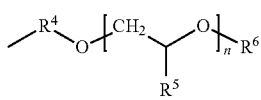

Group I

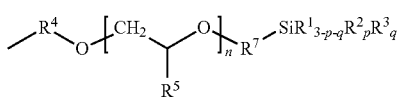

Group II

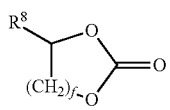

Group III each $R^4$ is individually a bond or a divalent spacer;

each $R^5$ and $R^6$ are individually hydrogen, alkyl, or aryl;

each $R^7$ is individually alkyl or aryl;

$R^8$ is a divalent organic spacer;

f is 1 or 2;

n is an integer from 0 to 15;

p is 0, 1, 2, or 3; and q is 0, 1, 2, or 3.

13. The composition of claim 12, wherein the compound of Formula II is:

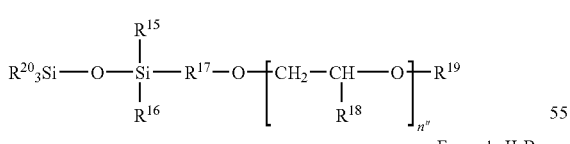

Formula II-A

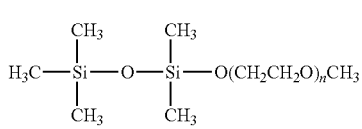

Formula II-B

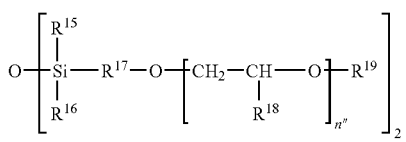

Formula II-C

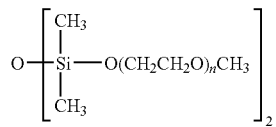

Formula II-D each $R^{15}$ and $R^{16}$ are individually an alkyl group or an aryl group;

each $R^{17}$ is a bond or a divalent spacer;

each $R^{18}$ is individually a hydrogen atom or an alkyl group;

each $R^{19}$ is individually an alkyl group;

each $R^{20}$ is individually an alkyl or an aryl group;

n is an integer from 1 to 15; and n" is an integer from 1 to 30.

14. The composition of claim 1, wherein the oligo(alkylene glycol)siloxane is a trisiloxane of Formula IV:

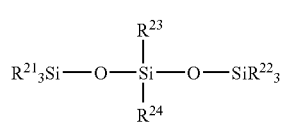

Formula IV wherein:

$R^{21}$, $R^{22}$, and $R^{23}$ are individually an alkyl group or an aryl group; and $R^{24}$ is selected from Group I, Group II, or Group III;

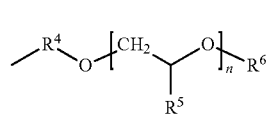

Group I

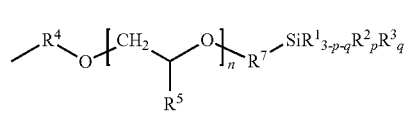

Group II

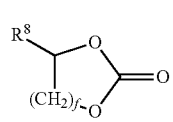

Group III each $R^4$ is individually a bond or a divalent spacer;

each $R^5$ and $R^6$ are individually hydrogen, alkyl, or aryl;

each $R^7$ is individually alkyl or aryl;

$R^8$ is a divalent organic spacer;

f is 1 or 2;

n is an integer from 0 to 15;

p is 0, 1, 2, or 3; and q is 0, 1, 2, or 3.

15. The composition of claim 1 further comprising a carbonate-based solvent.

16. The composition of claim 1, further comprising a silicon-containing compound having a carbonate group that is:

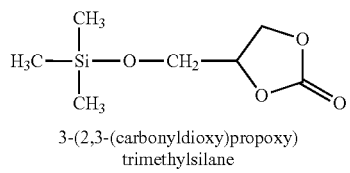
3-(2,3-(carbonyldioxy)propoxy) trimethylsilane

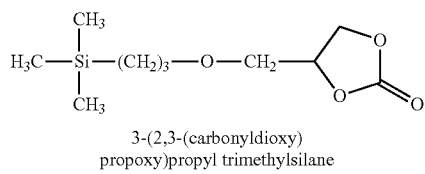
3-(2,3-(carbonyldioxy) propoxy)propyl trimethylsilane

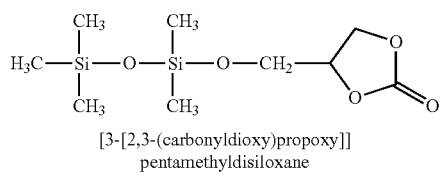
[3-[2,3-(carbonyldioxy)propoxy]] pentamethyldisiloxane

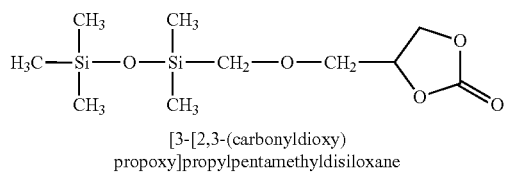
[3-[2,3-(carbonyldioxy) propoxy]propylpentamethyldisiloxane

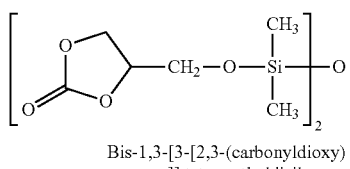
Bis-1,3-[3-[2,3-(carbonyldioxy) propoxy]] tetramethyldisiloxane

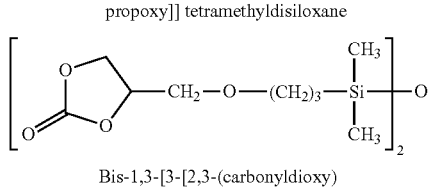
Bis-1,3-[3-[2,3-(carbonyldioxy) propoxy]propyl] tetramethyldisiloxane

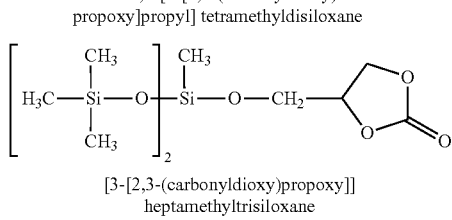
[3-[2,3-(carbonyldioxy)propoxy]] heptamethyltrisiloxane

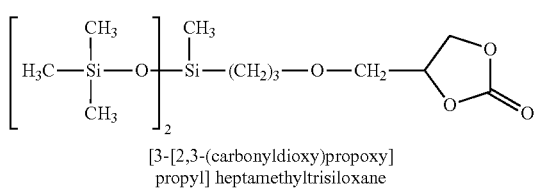
[3-[2,3-(carbonyldioxy)propoxy] propyl] heptamethyltrisiloxane

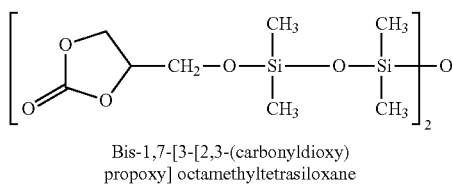
Bis-1,7-[3-[2,3-(carbonyldioxy) propoxy] octamethyltetrasiloxane

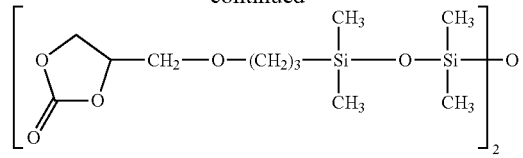
Bis-1,7-[3-[2,3-(carbonyldioxy)propoxy]propyl] octamethyltetrasiloxane or a mixture of any two or more thereof.

17. A method of forming a gel polymer electrolyte comprising:
heating the composition of claim 1 to an elevated temperature;
holding at the composition at the elevated temperature for a specified time; and
cooling the composition to ambient temperature.

18. An electrochemical cell comprising the composition of claim 1 and an electrode.

19. A method of assembling an electrochemical cell comprising:
coating the surface of a positive electrode laminate and a negative electrode laminate with the composition of claim 1;
heating the positive and negative electrodes;
stacking the positive electrode and the negative electrode to form the electrochemical cell;
winding or folding the electrochemical cell to prepare a spiral wound cell or prismatic cell; and
packaging the spiral wound or prismatic electrochemical cell in a metal can, a plastic pouch, or a laminated plastic/metal foil pouch.

20. A composition for forming a fast-cure gel polymer electrolyte comprising:
an oligo(alkylene glycol) silane or an oligo(alkylene glycol) siloxane;
a cross-linking agent that is:

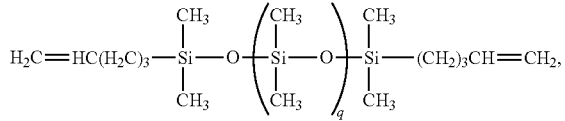

wherein q is an integer from 4 to 35;
a second cross-linking agent and a cross-linking density controller, wherein the second cross-linking agent is a compound of Formula V and the cross-linking density controller is a compound of Formula VI:

Formula V

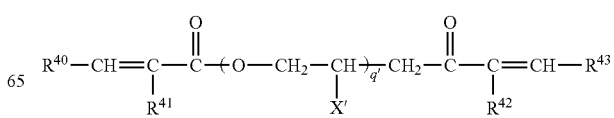

-continued
Formula VI
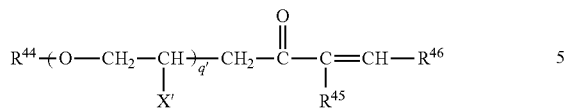
wherein:
$R^{40}$, $R^{41}$, $R^{42}$, $R^{43}$, $R^{44}$, $R^{45}$ and $R^{46}$ are each independently hydrogen, an alkyl group having from 1 to 12 carbon atoms, or an alkenyl group having from 2 to 12 carbon atoms;
X' is hydrogen, methyl, or ethyl; and
q' is an integer from 1 to 20;
a salt;
a cross-linking initiator;
an initiator promoter; and
an electrode stabilizing additive.
* * * * *